(12) United States Patent
Takeshita et al.

(10) Patent No.: US 7,554,675 B2
(45) Date of Patent: Jun. 30, 2009

(54) LIGHT WAVEFRONT MEASURING INSTRUMENT, LIGHT WAVEFRONT MEASURING METHOD, AND LIGHT SOURCE ADJUSTING METHOD

(75) Inventors: Nobuo Takeshita, Tokyo (JP); Teruo Fujita, Tokyo (JP); Toshiya Matozaki, Tokyo (JP); Michihiro Tadokoro, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 264 days.

(21) Appl. No.: 10/548,838

(22) PCT Filed: Nov. 17, 2003

(86) PCT No.: PCT/JP03/14593

§ 371 (c)(1),
(2), (4) Date: Sep. 13, 2005

(87) PCT Pub. No.: WO2004/094981

PCT Pub. Date: Apr. 11, 2004

(65) Prior Publication Data

US 2006/0227335 A1 Oct. 12, 2006

(30) Foreign Application Priority Data

Apr. 21, 2003 (JP) .............................. 2003-115359

(51) Int. Cl.
*G01B 9/02* (2006.01)
(52) U.S. Cl. ..................................... 356/521
(58) Field of Classification Search ................ 356/488, 356/489, 494, 495, 512–515
See application file for complete search history.

(56) References Cited

U.S. PATENT DOCUMENTS 4,804,269 A * 2/1989 Elterman .................... 356/520

(Continued)

FOREIGN PATENT DOCUMENTS

EP 0 204 495 A2 12/1986

(Continued)

OTHER PUBLICATIONS

Technical Paper of Optical Storage International SPIE vol. 695 Optical Mass Data Storage II (1986) pp. 206-214. Oudenhuysen et al., "Optical Component Inspection for Data Storage Applications".

*Primary Examiner*—Tarifur Chowdhury
*Assistant Examiner*—Jonathan M Hansen
(74) *Attorney, Agent, or Firm*—Birch, Stewart, Kolasch & Birch, LLP

(57) ABSTRACT

A light wavefront measuring apparatus (2, 2a, 42) includes a separating element (7a, 47a) for separating a flux of light which exits from an optical head (1, 31) into a first beam and a second beam, a first interference fringe display section (21, 21a) for displaying interference fringes formed from the first beam, a Dove prism (13, 53) for rotating a wavefront of the second beam around its optical axis ($AX_2$), and a second interference fringe display section (22, 22a) for displaying interference fringes formed from the second beam which passed through it. In adjustment of the light source device, position of a collimator (5) in the optical head (1, 31) is adjusted in optical axis direction so as to approximate the interference fringe patterns displayed in the interference fringe display sections (21, 22, 21a, 22a) each other.

11 Claims, 17 Drawing Sheets

U.S. PATENT DOCUMENTS

| | | | |
|---|---|---|---|
| 5,157,459 A * | 10/1992 | Oono et al. | 356/520 |
| 5,317,144 A | 5/1994 | Oono et al. | |
| 5,410,532 A | 4/1995 | Ohno et al. | |
| 5,557,598 A | 9/1996 | Oono et al. | |
| 6,469,788 B2 * | 10/2002 | Boyd et al. | 356/369 |

FOREIGN PATENT DOCUMENTS

| | | |
|---|---|---|
| JP | 61-281209 A | 12/1986 |
| JP | 63-38103 A | 2/1988 |
| JP | 3-119524 A | 5/1991 |
| JP | 2002-182091 A | 6/2002 |

* cited by examiner

LIGHT WAVEFRONT MEASURING INSTRUMENT, LIGHT WAVEFRONT MEASURING METHOD, AND LIGHT SOURCE ADJUSTING METHOD

TECHNICAL FIELD

The present invention relates to a light wavefront measuring apparatus for measuring a wavefront aberration of a flux of light which ejects from a light source device such as an optical head, a light wavefront measuring method and a method of adjusting a light source device.

BACKGROUND ART

As an astigmatism correction method in an optical system of an optical head which is used for recording information in or reproducing information from an optical disk, there has been a method to adjust a position of an optical member in the optical head according to a visual observation of ellipticity of an interference ring caused by an exiting beam from the optical head so that the ellipticity is decreased. See, for example, Japanese Patent Kokai Publication No. 61-281209 (page 3, lower-left column to upper-right column and FIG. 2).

However, because in the above-mentioned conventional correction method the adjustment of the position of the optical member is based on ellipticity of an interference ring which is difficult to be judged and is likely to be differently judged according to each of observers, the conventional method has problems that astigmatism correction accuracy is not ensured and the adjustment is difficult and time-consuming.

DISCLOSURE OF INVENTION

An object of the present invention is to provide a light wavefront measuring apparatus for and a light wavefront measuring method of observing a wavefront of an incident beam precisely and easily and a method of adjusting a light source device precisely and easily.

The light wavefront measuring apparatus of the present invention includes a separating element separating a flux of incident light into a first beam and a second beam; a first interference fringe display section being placed in the first beam and displays an interference fringe formed from the first beam; a second interference fringe display section which has the same structure as that of the first interference fringe display section, is located in the second beam and displays an interference fringe formed from the second beam; and a wavefront rotating element which is located at least one of between the separating element and the first interference fringe display section and between the separating element and the second interference fringe display section and rotates at least one of wavefronts of the first beam and of the second beam around an optical axis thereof.

The light wavefront measuring method of the present invention includes the steps of: separating a flux of incident light into a first beam and a second beam; rotating at least one of wavefronts of the first beam and the second beam around an optical axis thereof; and displaying an interference fringe of the first beam together with an interference fringe of the second beam after the rotating step.

The light source device adjusting method of the present invention includes the steps of: separating a flux of light which exits from the light source into a first beam and a second beam; rotating at least one of wavefronts of the first beam and the second beam around an optical axis thereof; displaying an interference fringe of the first beam together with an interference fringe of the second beam after the rotating step; and adjusting a position of an optical member in the light source device so as to equate the interference fringe of the first beam and the interference fringe of the second beam.

BEST MODE FOR CARRYING OUT THE INVENTION

Embodiment 1

Figure 1:
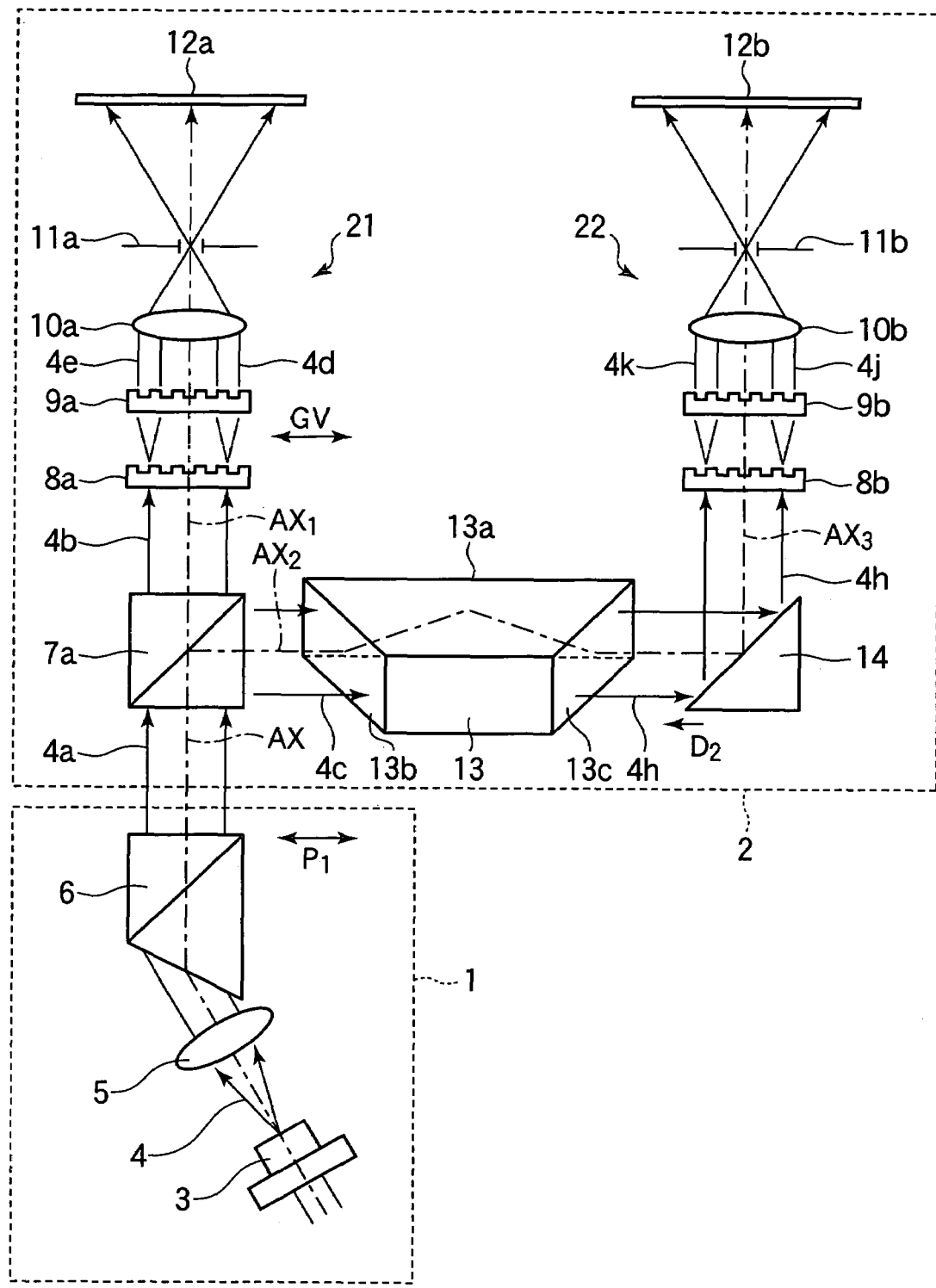
FIG. 1 illustrates a configuration of a light wavefront measuring apparatus to carry out a light wavefront measuring method in Embodiment 1 of the present invention (a light wavefront measuring apparatus used for carrying out a light source device adjusting method of Embodiment 1)

FIG. 1 illustrates the configuration of the light wavefront measuring apparatus to carry out the light wavefront measuring method in Embodiment 1 of the present invention (the light wavefront measuring apparatus used for carrying out the light source device adjusting method). The configuration of an optical head 1 as a light source device to be measured by a light wavefront measuring apparatus 2 is also shown in FIG. 1.

As shown in FIG. 1, the light wavefront measuring apparatus 2 of Embodiment 1 measures astigmatism (or wavefront aberration) of an optical system of the optical head 1. A light source 3 such as a semiconductor laser, a collimator lens (hereinafter denoted as "collimator") 5 and a beam shaping prism 6 are main components of the optical head 1 to be measured. A flux of light (that is, a beam) 4 which exits from the light source 3 is changed into a parallel beam at the collimator 5 and enters into the beam shaping prism 6. The incident beam on the beam shaping prism 6 exits as a beam 4a with its intensity distribution changed. The intensity distribution is not changed in a $V_1$ direction (shown in FIG. 2 and FIG. 3 described below) vertical to a reference plane (being parallel with a paper sheet on which FIG. 1 is illustrated and denoted as RP in FIG. 2 described below), but is enlarged in a $P_1$ direction parallel with the reference plane and vertical to an optical axis AX. According to this change, the beam 4 with an ellipsoidal intensity distribution in a vertical plane to the optical axis becomes the beam 4a of which the intensity distribution in the vertical plane to the optical axis is nearly circular. The optical head 1 is a light source device equipped in such as an optical disk apparatus for recording information in or reproducing information from an optical disk. In the optical disk apparatus, for example, the optical head makes beams collected on an optical disk by an objective lens (not shown).

As shown in FIG. 1, a light wavefront measuring apparatus 2 in Embodiment 1 includes a separating element 7a, a Dove prism 13 as a wavefront rotating element, a first interference fringe display section 21 and a second interference fringe display section 22, as main parts.

In FIG. 1, the separating element 7a is an optical element at which a part of the incident beam 4a is transmitted and the other part of the incident beam 4a is reflected. The transmitted and reflected beams are first and second beams 4b and 4c, respectively. The separating element 7a can be differently configured as long as it separates the incident beam 4a.

Figure 2:
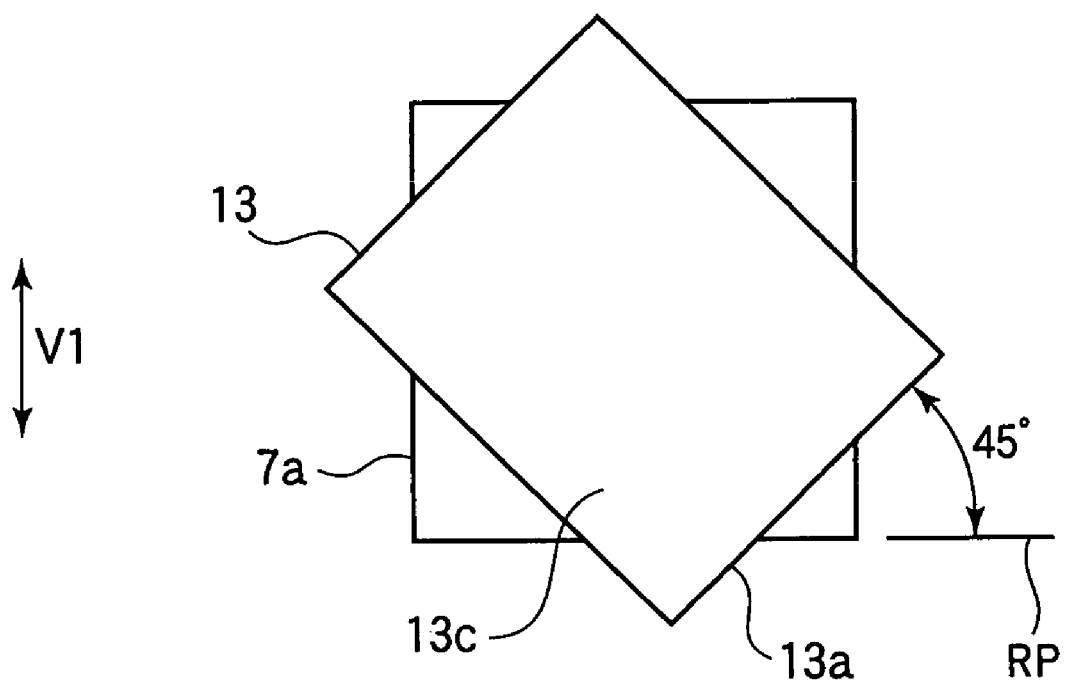
FIG. 2 illustrates a view of FIG. 1 in a $D_2$ direction.

FIG. 2 illustrates a view of FIG. 1 in the $D_2$ direction. As shown in FIG. 1 or 2, the Dove prism 13 is a pillar-shaped optical element with two trapezoidal sides. The Dove prism is an optical element which enables to rotate the wavefront of the transmitted beam around its optical axis just twice a rotation angle of the Dove prism by rotating around its axis line (extending in the parallel direction with an optical axis $AX_2$ in FIG. 1). As shown in FIG. 2, in Embodiment 1, the Dove prism 13 is placed so that its reflection inside plane 13a forms an angle of forty-five degrees with the reference plane RP (a plane being parallel to the paper sheet on which FIG. 1 is illustrated and extending in the horizontal direction in FIG. 2). For this reason, the Dove prism 13 can rotate a wavefront of the second beam 4c incident on an incident plane 13b ninety degrees around the optical axis $AX_2$ and accordingly a second beam 4h thus obtained exits from an exit plane 13c.

Figure 3:
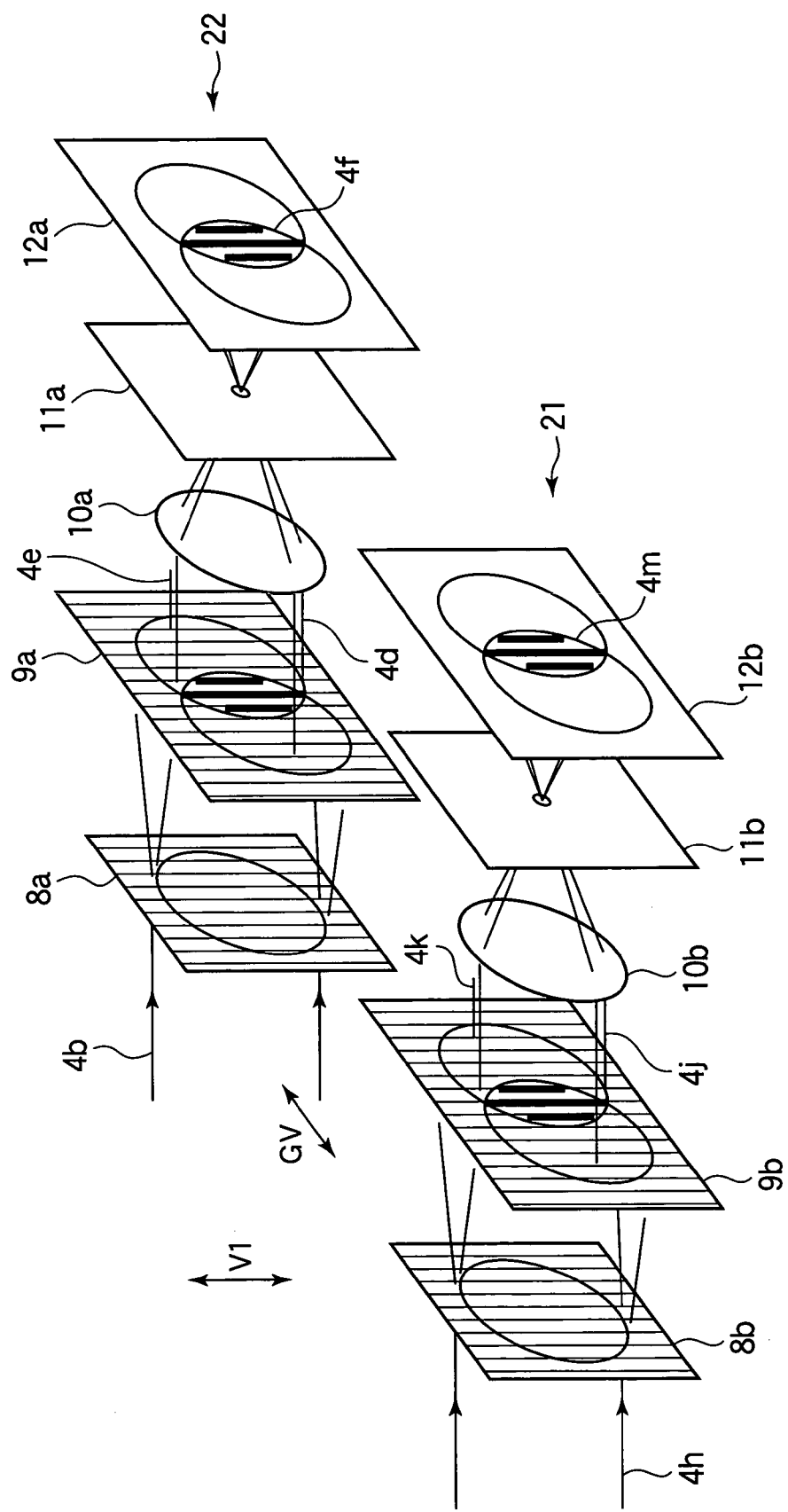
FIG. 3 schematically illustrates a perspective view of first and second interference fringe display sections in Embodiment 1.

FIG. 3 schematically illustrates a perspective view of the first and second interference fringe display sections 21 and 22 in Embodiment 1. As shown in FIG. 1 or FIG. 3, the first and second interference fringe display sections 21 and 22 have the same structure and are placed on the reference plane RP (a plane being parallel to the paper sheet on which FIG. 1 is illustrated and extending in the horizontal direction in FIG. 2) side by side. Accordingly, the optical axis AX of the beam 4a, the optical axis $AX_1$ of the beam 4b, the optical axis $AX_2$ of the beam 4c, and an optical axis $AX_3$ of the beam 4h (a beam having been reflected by a mirror 14) shown in FIG. 1 are parallel to the reference plane RP.

As shown in FIG. 1 and FIG. 3, the first interference fringe display section 21 has a first diffraction grating 8a, a second diffraction grating 9a, a converging lens 10a, a pinhole plate 11a having a pinhole, and a first display section 12a. Each of a grating vector direction (grating arrangement direction) of the first diffraction grating (the first stage diffraction grating in the first interference fringe display section 21) 8a and a grating vector direction of the second diffraction grating (the second stage diffraction grating in the first interference fringe display section 21) 9a is a GV direction which is parallel to the reference plane RP and is orthogonal to the optical axis $AX_1$ of the transmitting beam.

As shown in FIG. 1 and FIG. 3, the second interference fringe display section 22 has a third diffraction grating (the first stage diffraction grating in the second interference fringe display section 22) 8b, a fourth diffraction grating (the second stage diffraction grating in the second interference fringe display section 22) 9b, a converging lens 10b, a pinhole plate 11b having a pinhole, and a second display section 12b. The structures of the third diffraction grating 8b and the fourth diffraction grating 9b are the same as those of the first diffraction grating 8a and the second diffraction grating 9a, respectively. The converging lens 10b has the same structure as that of the converging lens 10a and the pinhole plate 11b has the same structure as that of the pinhole plate 11a. Each of a grating vector direction of the third diffraction grating 8b and a grating vector direction of the fourth diffraction grating 9b is the GV direction which is parallel to the reference plane RP and is orthogonal to the optical axis $AX_3$ of the transmitting beam.

Next, an operation of the light wavefront measuring apparatus 2 in Embodiment 1 (the light wavefront measuring method) will be explained. As illustrated in FIG. 1, the beam 4a enters into the light wavefront measuring apparatus 2 and is split into the first beam 4b and the second beam 4c by the separating element 7a. As shown in FIG. 1, the beam 4b is diffracted by the first diffraction grating 8a, then a plus 1st-order ray and a minus 1st-order ray are mainly obtained. The second diffraction grating 9a diffracts each of the diffracted rays and creates other plus 1st-order ray and minus 1st-order ray. The plus 1st-order diffracted ray from the first diffraction grating 8a is diffracted at the second diffraction grating 9a then the minus 1st-order ray is obtained as a beam 4d. The minus 1st-order diffracted ray from the first diffraction grating 8a is diffracted at the second diffraction grating 9a then the plus 1st-order ray is obtained as a beam 4e. The beams 4d and 4e collected at the converging lens 10a pass through the pinhole of the pinhole plate 11a and an unnecessary beam is accordingly removed. Then, interference fringes are generated in an interference fringe display area (crosshatched areas) 4f on the first display section 12a.

As FIG. 1 illustrates, the wavefront of the second beam 4c, the other beam separated by the separating element 7a is rotated ninety degrees around the optical axis $AX_2$ at the Dove prism 13, then the second beam 4h is obtained. The beam 4h changes its direction at the mirror 14 and is diffracted by the third diffraction grating 8b and then a plus 1st-order ray and a minus 1st-order ray are mainly obtained. The fourth diffraction grating 9b diffracts each of the diffracted rays and other plus 1st-order ray and minus 1st-order ray are generated. The plus 1st-order diffracted ray from the third diffraction grating 8b is diffracted at the fourth diffraction grating 9b, then a minus 1st-order ray is obtained as a beam 4j. The minus 1st-order diffracted ray from the third diffraction grating 8b is diffracted at the fourth diffraction grating 9b then a plus 1st-order ray is obtained as a beam 4k. The beams 4j and 4k collected at the converging lens 10b pass through the pinhole of the pinhole plate 11b, and consequently an unnecessary beam is removed. Then, interference fringes are generated in an interference fringe display area (crosshatched areas) 4m on the second display section 12b.

As shown in FIG. 1 and FIG. 3, in Embodiment 1, phase information of the $P_1$ direction (being parallel to the paper sheet on which FIG. 1 is illustrated and being orthogonal to the optical axis AX) of the wavefront of the beam 4a which exits from the optical head 1 is displayed as interference fringes in the interference fringe display area 4f in the first display section 12a. On the other hand, phase information of the $V_1$ direction (being orthogonal to the $P_1$ direction and to the optical axis AX) of the wavefront of the beam 4a from the optical head 1 is displayed as interference fringes in the interference fringe display area 4m in the second display section 12b. Moreover, in Embodiment 1, the optical axis $AX_1$ of the first beam 4a and the optical axis $AX_3$ of the second beam 4h are collimated by the mirror 14 and the interference fringe display area 4f in the first display section 12a and the interference fringe display area 4m in the second display section 12b are located side by side as indicated in FIG. 3. Accordingly, phase information in two directions orthogonal each other of the beam 4a from the optical head 1 can be easily compared. For this reason, according to the light wavefront measuring method and apparatus of Embodiment 1, wavefronts (or phase information) of a flux of light which is to be measured can be simultaneously, precisely and easily measured in two directions vertical to the optical axis.

In the above, we explained the method and the configuration for displaying phase information of the wavefront of the beam 4a, as interference fringes, in parallel and vertical directions to the paper sheet in which FIG. 1 is illustrated in the display sections 12a and 12b, respectively. For example, if the wavefront of the beam 4a in parallel direction to the paper sheet showing FIG. 1 is a plane wave, the display section 12a shows a zero fringe condition with almost no interference fringe. Similarly, if the wavefront in the vertical direction to the paper sheet illustrating FIG. 1 is a plane wave, a zero fringe condition is displayed on the display section 12b. On the other hand, if the wavefront in the parallel direction to the paper sheet is a spherical wave, some interference fringes are displayed in the display section 12a. Also, if the wavefront in the vertical direction to the paper sheet is a spherical wave, some interference fringes are displayed in the display section 12b.

Figure 4:
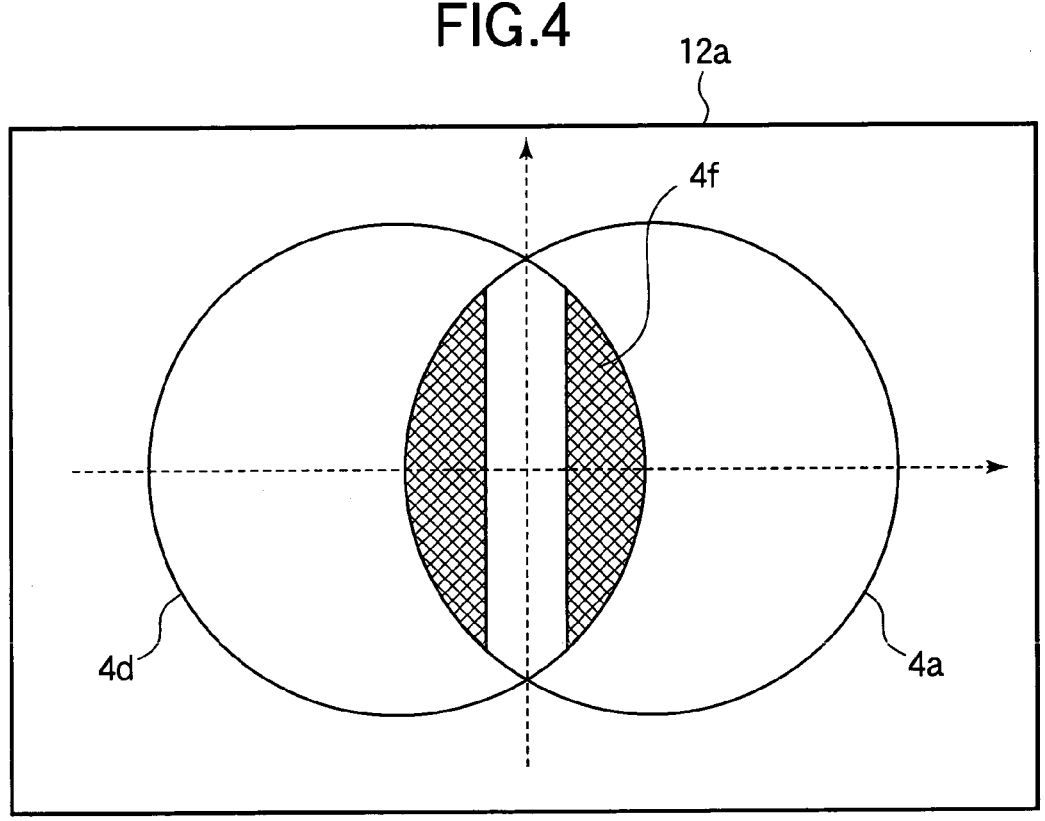
FIG. 4 schematically illustrates interference fringes displayed in a first display section in Embodiment 1.
Figure 5:
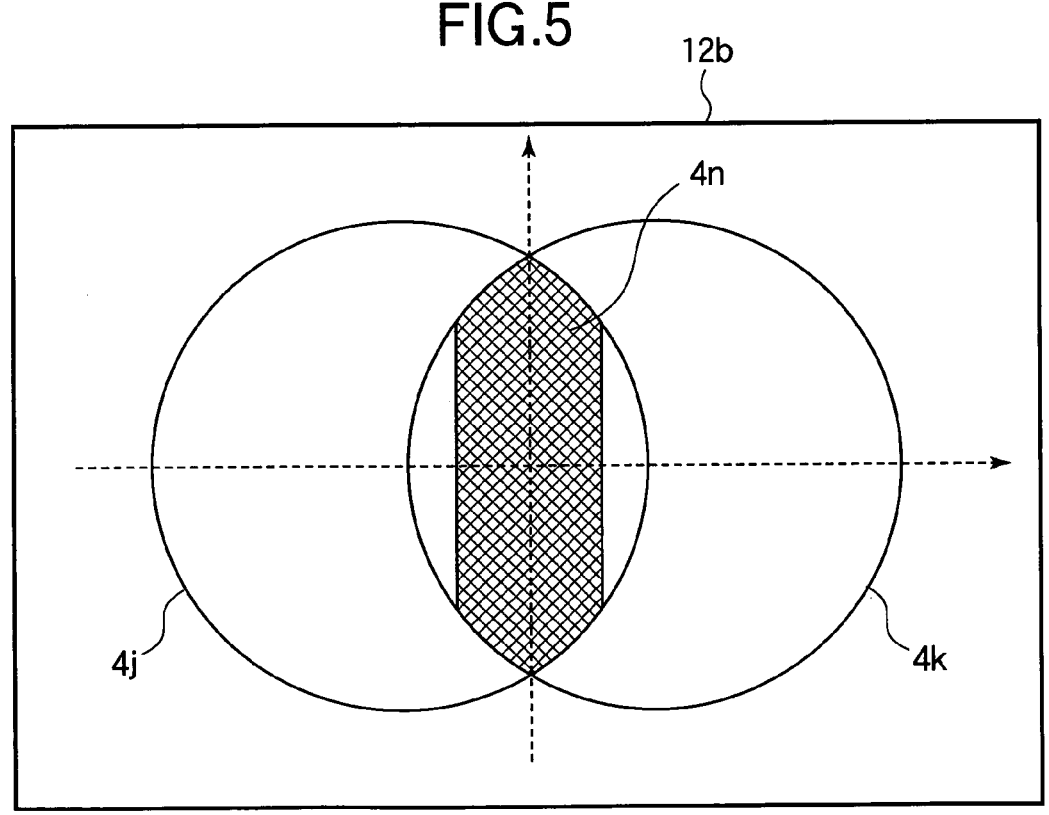
FIG. 5 schematically illustrates interference fringes displayed in a second display section in Embodiment 1.

Next, a method of adjusting the optical head 1 will be explained. FIG. 4 schematically illustrates interference fringes displayed in the display section 12a in Embodiment 1. FIG. 5 schematically illustrates interference fringes displayed in the second display section 12b in Embodiment 1. When the beam 4a which exits from the optical head 1 has astigmatism, intervals between the interference fringes displayed in the first and second display sections 12a and 12b are different, as illustrated in FIG. 4 and FIG. 5. Conversely, if the interference fringes with relatively same intervals each other are displayed in the first and second display sections 12a and 12b, wavefronts in these two directions of the beam 4a can be aligned and therefore astigmatism in these two directions can be reduced. Particularly, the adjustment can be achieved by shifting the collimator 5 in the optical axis direction in the optical head 1 which is to be measured.

The reason why the amount of astigmatism in the beam 4 can be thus reduced by shifting the collimator 5 in the optical axis direction will be explained.

Shifting the collimator 5 in the optical axis direction makes the beam which passed the collimator 5 non-parallel (decollimated). Correction of the astigmatism can be achieved according to an inherent characteristic of anamorphic optical system that the decollimated beam generates astigmatism when it enters in the anamorphic optical system (which corresponds to the beam shaping prism 6 in the present application).

Because the decollimated beam enters in the anamorphic optical system, an observation of changes in shapes of interference fringe pattern according to the shift of the collimator 5 along the optical axis permits the collimator to be located in a position where the same extent of astigmatism is provided as the astigmatism which is substantially corrected by the anamorphic optical system. Moreover, the shape of the interference fringe pattern represents the existence and amount of astigmatism in a beam entering in the interferometer. When a circular interference fringe pattern is observed, the anamorphic optical system provides astigmatism which cancels astigmatism in the semiconductor laser 3 directly. That is, when a beam has no astigmatism (in Japanese Patent Kokai Publication No. 61-281209, when a circular interference fringe pattern is observed), intervals between interference fringes displayed in the display sections 12a and 12b are approximately equal in the present application.

In the light wavefront measuring method and apparatus in Embodiment 1 of the present invention, the separating element splits a beam to be measured into two: one of the split beams passes through the first diffraction element 8a (the first stage diffraction grating in the first interference fringe display section 21) and the second diffraction element 9a (the second stage diffraction grating in the first interference fringe display section 21); and the other beam with its wavefront rotated ninety degrees by the Dove prism passes through the third diffraction element 8b (the first stage diffraction grating in the second interference fringe display section 22) and the fourth diffraction element 9b (the second stage diffraction grating in the second interference fringe display section 22). Interference fringes are accordingly generated and displayed in the display sections 12a and 12b, respectively. Hence the phase differences between the wavefronts in two directions mutually different ninety degrees can be concurrently observed as the differences between the interference fringes.

Therefore, in the light wavefront measuring method and apparatus in Embodiment 1, the phase information of the wavefronts in horizontal and vertical directions of an incident beam into the apparatus can be simultaneously displayed as interference fringes. For this reason, an adjustment to reduce the amount of astigmatism in the optical head 1 which is to be measured according to real-time observation of the interference fringes realizes a precise and prompt astigmatism correction in the optical head 1. That is, the light wavefront measuring apparatus or method produces an effect that wavefront aberration of a flux of light which exits from the light source can be precisely and easily measured because the flux of light of the light source device which is a system to be measured is split, at least one of the split beams is rotated and then interference fringes in a plurality of directions which are orthogonal to the optical axis are displayed so as to be easily contrasted each other.

Although in the above explanation the Dove prism for rotating a wavefront of a beam is located in only the second beam, the Dove prism may be placed in only the first beam or in both of the first and second beams. In such a case, for example, each of the wavefronts of the first and second beams may be rotated at forty-five degrees in the opposite direction with respect to each other.

The wavefront rotation angle of the first or second beam is not limited to ninety degrees.

Moreover, although two split beams are used in the above example, it is also available that splitting a flux of light into three or more beams by using a plurality of separating elements, rotating wavefronts of the split beams different angles each other and thus displaying three or more kinds of interference fringes simultaneously.

Embodiment 2

Figure 6:
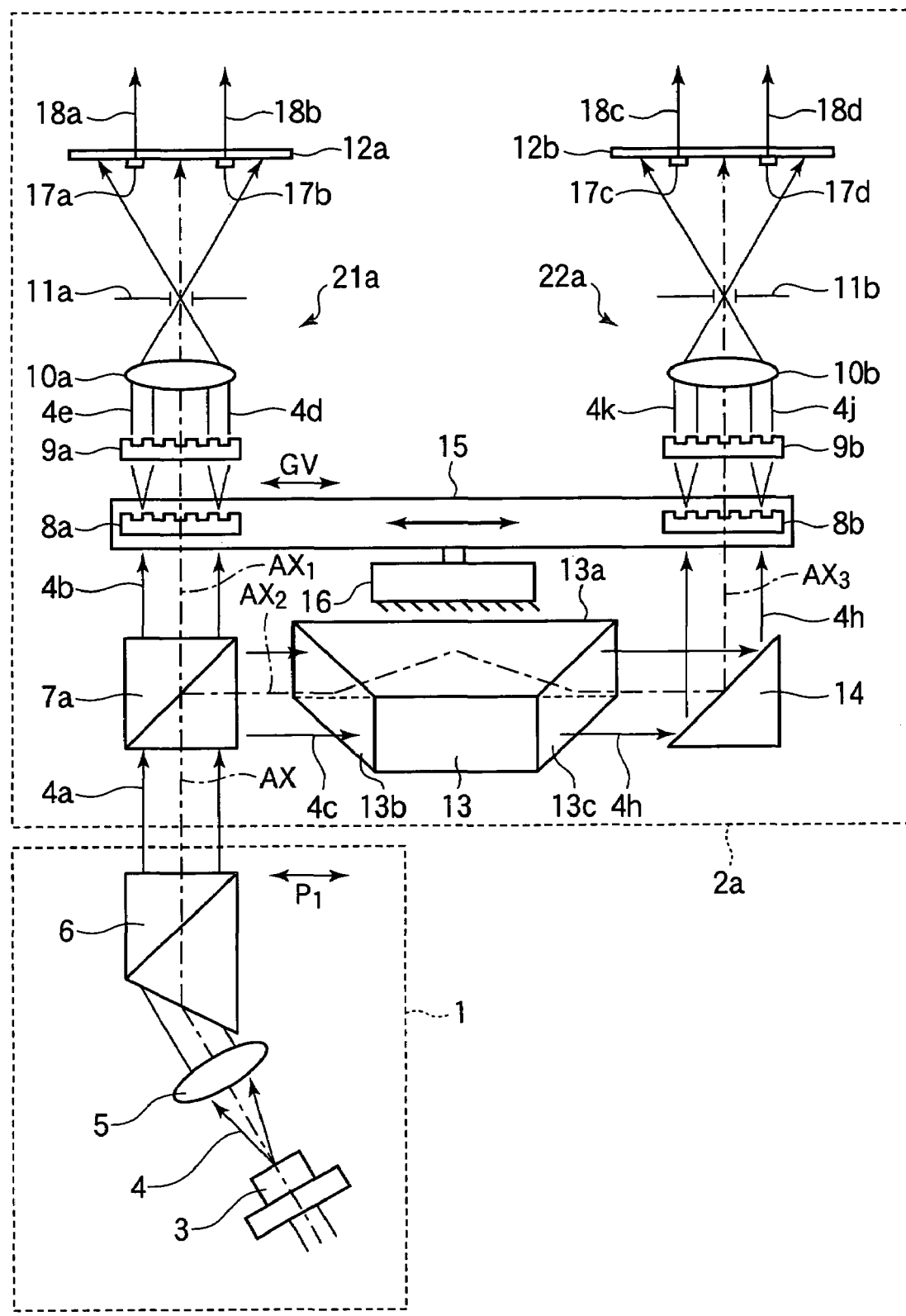
FIG. 6 illustrates a configuration of a light wavefront measuring apparatus to carry out a light wavefront measuring method in Embodiment 2 of the present invention (a light wavefront measuring apparatus used for carrying out a light source device adjusting method of Embodiment 2)

FIG. 6 illustrates the configuration of a light wavefront measuring apparatus for implementing a light wavefront measuring method in Embodiment 2 of the present invention (a light wavefront measuring apparatus used when a light source device adjusting method in Embodiment 2 is implemented). FIG. 6 also shows the configuration of the optical head 1 as a light source device is to be measured by a light wavefront measuring apparatus 2a in Embodiment 2. In FIG. 6, the same reference numerals are assigned to the components which are the same as or correspond to those shown in FIG. 1 (Embodiment 1).

Figure 7:
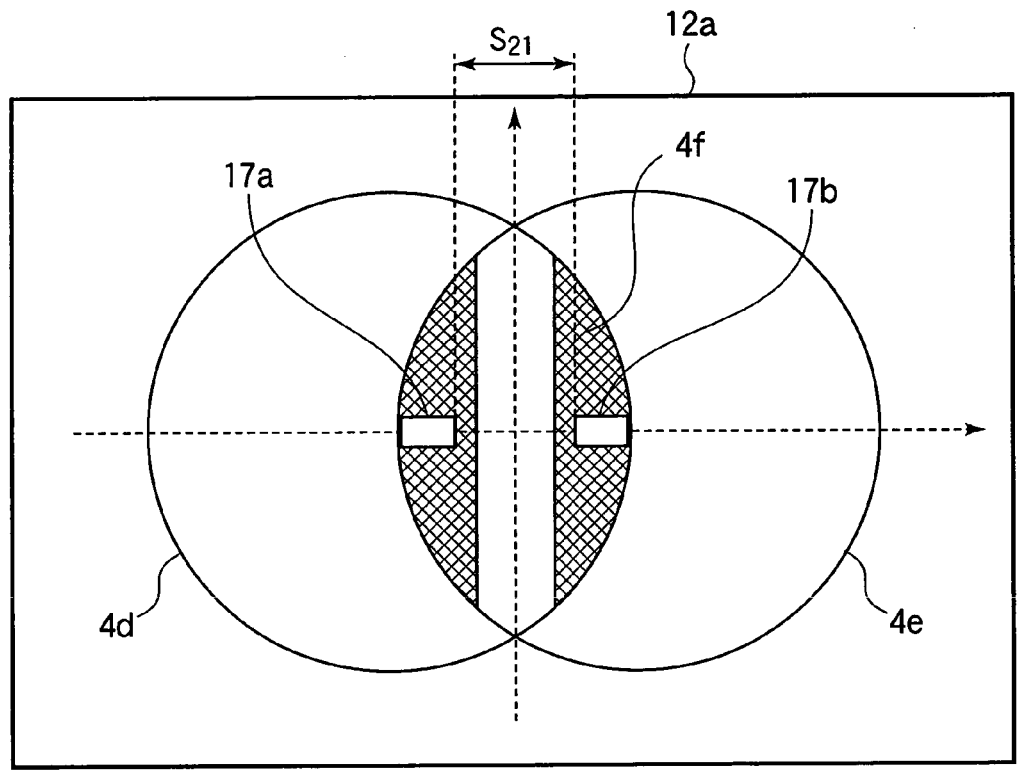
FIG. 7 schematically illustrates interference fringes displayed in a first display section in Embodiment 2.
Figure 8:
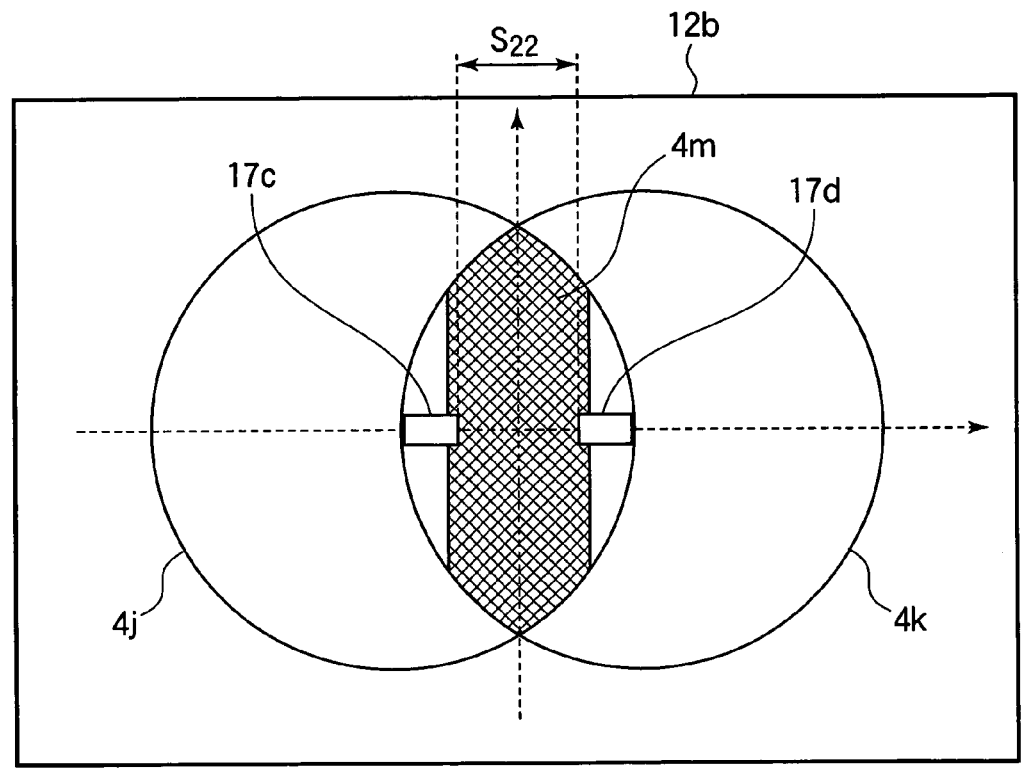
FIG. 8 schematically illustrates interference fringes displayed in a second display section in Embodiment 2.

FIG. 7 and FIG. 8 schematically illustrate interference fringes displayed in the first display section 12a and in the second display section 12b in Embodiment 2, respectively.

As shown in FIG. 6, the light wavefront measuring apparatus 2a in Embodiment 2 has first and second photodetectors 17a and 17b placed on near ends of the interference fringe display area 4f on the first display section 12a with a first interval $S_{21}$ between the photodetectors; and third and fourth photodetectors 17c and 17d placed on near ends of the interference fringe display area 4m on the second display section 12b with a second interval $S_{22}$ between the photodetectors which is equal to the first interval $S_{21}$. The light wavefront measuring apparatus 2a in Embodiment 2 also includes a stator 15 for holding the first and third diffraction gratings unitarily and a moving mechanism 16 for shifting the stator 15 at a predetermined velocity (for example, at a constant speed) along a grating vector's direction (an arrangement direction of a diffraction grating), that is, the GV direction.

Figure 9:
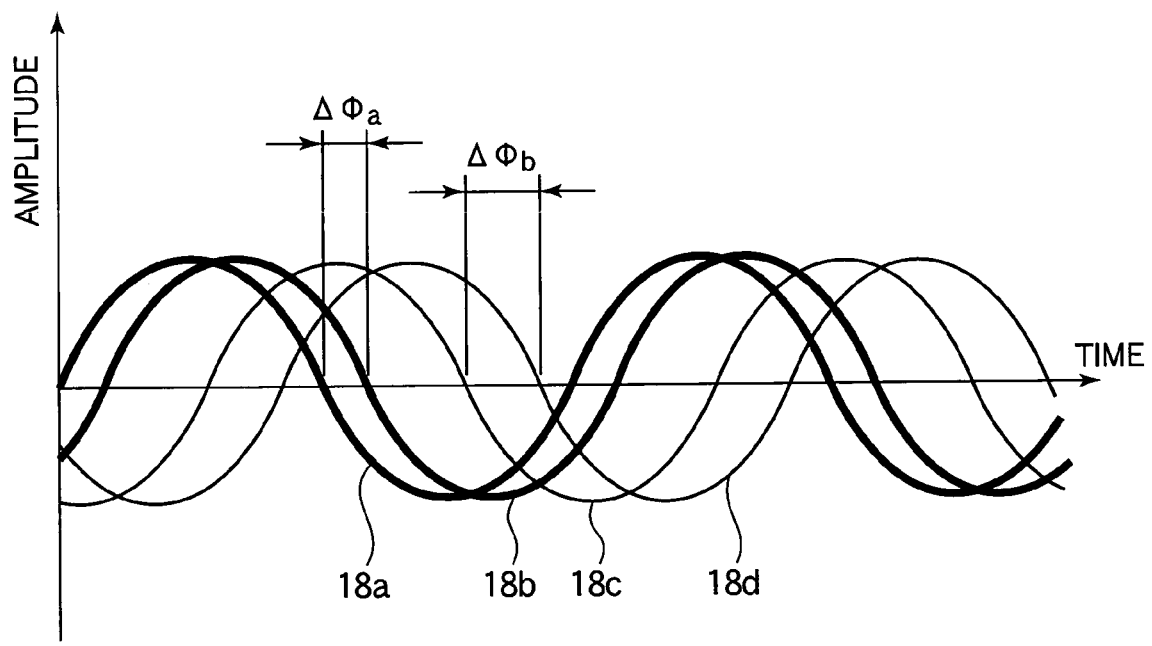
FIG. 9 illustrates waveforms of and phase differences between output signals from first to fourth photodetectors in Embodiment 2.

Next, an operation of the light wavefront measuring apparatus 2a in Embodiment 2 will be explained. FIG. 9 shows waveforms of output signals from the first to fourth photodetectors 17a to 17d.

The electrical signals 18a and 18b represent output signals from the photodetectors 17a and 17b, respectively, when the moving device 16 moves the diffraction gratings 8a and 8b along the grating vector's direction. On the other hand, the electrical signals 18c, 18d represent output signals from the photodetectors 17c and 17d, respectively. The waveforms of these signals correspond to interference fringe patterns. The photodetectors 17a and 17b and the photodetectors 17c and 17d are placed near ends of the interference areas 4f and 4m respectively for the purpose of improving a measurement accuracy. That is, it is difficult to determine by a visual observation whether patterns of the interference areas 4f and 4m are the same or not because a semiconductor laser which is practically used as the light source 3 in the optical head 1 contains a few micrometers of astigmatic difference and when the collimator 5 is adjusted so that the beam 4a is free from astigmatism, the interference areas 4f and 4m are in a sub-fringe condition with few interference fringes. For this reason, the photodetectors 17a and 17b are placed near ends of the interference areas 4f and 4m so that shapes of interference fringes can be observed by using the electrical signals and the phase difference between the electrical signals 18a and 18b can be observed in large size. It is satisfactory that the phase difference is calculated to the first decimal point in degrees of angle. The interval between the photodetectors 17a and 17b, even though variable depending on the magnification of the optical system, is at least a few millimeters.

The moving device 16 makes the stator 15 move the first and third diffraction gratings 8a and 8b unitarily in the grating vector's direction (GV direction). Receiving the beams 4d and 4e, the first and second photodetectors 17a and 17b output the electrical signals 18a and 18b respectively according to bright and dark fringes created by the beams. Likewise, receiving the beams 4j and 4k, the third and fourth photodetectors 17c and 17d output electrical signals 18c and 18d respectively according to bright and dark fringes created by the beams.

The phase difference $\Delta \phi_a$ between the output signals 18a and 18b from the first and second photodetectors 17a and 17b, respectively, as well as the phase difference $\Delta \phi_b$ between the output signals 18c and 18d from the third and the fourth photodetector 17c and 17d, respectively, corresponds to aberration in each directions of a wavefront and their relative difference is proportional to the amount of the astigmatism in the beam 4a. As such, the amount of the astigmatism can be reduced by adjusting position of the optical member in the optical head 1 which is to be measured so as to the phase differences $\Delta \phi_a$ and $\Delta \phi_b$ are equal.

FIG. 9 illustrates output waveforms of the electrical signals 18a to 18d where time in the horizontal axis and amplitude in the vertical axis. The electrical signals 18a to 18d are output according to intensity changes in the interference fringes on the photodetectors 17a to 17d, respectively. Their frequencies are determined by dimensions of the first diffraction gratings 8a and 8b and moving velocity of the moving apparatus 16, however, in a sub-fringe (zero-fringe) condition, the frequency difference cannot be detected without using the phase difference.

When all of the electrical signals 18a, 18b, 18c and 18d are in a sub-fringe condition, if the phase difference $\Delta \phi_a$ between the electrical signals 18a and 18b are equal to the phase difference $\Delta \phi_b$ between the electrical signals 18c and 18d, their frequencies are also equal and the interference areas 4f and 4m have the same interference fringe patterns. It means that the wavefronts of the beam 4a in the horizontal and vertical directions to a paper sheet on which FIG. 6 is illustrated conforms each other, that is, the beam 4a does not include astigmatism. In other words, in order to reduce the amount of the astigmatism in the beam 4a proportional to difference between the phase differences $\Delta \phi_a$ and $\Delta \phi_b$, it is effective to adjust the optical system so that these phase differences $\Delta \phi_a$ and $\Delta \phi_b$ are equal. Although each of the phase differences $\Delta \phi_a$ and $\Delta \phi_b$ indicates time that amplitude outputs across the zero level, similar values can be obtained by measurement at all levels in principle because all of the photodetectors output almost the same frequencies in a sub-fringe condition.

As indicated in FIG. 6, in Embodiment 2, phase information in the $P_1$ direction (being parallel to the paper sheet on which FIG. 6 is illustrated and being orthogonal to the optical axis AX) of the wavefront of the beam 4a which exits from the optical head 1 is displayed as interference fringes in the interference fringe display area (crosshatched areas) 4f in the first display section 12a. At the same time, phase information in the $V_1$ direction (being orthogonal to the $P_1$ direction and the optical axis AX) of the wavefront of the beam 4a is displayed as interference fringes in the interference fringe display area (crosshatched areas) 4m in the second display section 12b. Moreover, in Embodiment 2, by the provision of the intervals between the photodetectors: the interval $S_{21}$ between the first and second photodetectors 17a and 17b in the interference fringe display area 4f of the first display section 12a and the interval $S_{22}$ between the third and fourth photodetectors 17c and 17d in the interference fringe display area 4m of the second display section 12b, the phase information in two directions orthogonal to each other of the beam 4a which exits from the optical head 1 can be quantitatively measured. As such, according to the light wavefront measuring method and apparatus of Embodiment 2, wavefronts (or phase information) in two vertical directions to the optical axis of a beam to be measured can be simultaneously and easily measured.

Therefore, the light wavefront measuring method or apparatus in Embodiment 2 can realize precise and quick astigmatism correction in the optical head 1 by adjustment to reduce the amount of astigmatism in the optical head 1 which is an object to be measured according to real-time observation of the phase differences of the electrical signals. That is, the light wavefront measuring apparatus or method of the present invention produces an effect that wavefront aberration in an exit beam from the light source can be further precisely and easily measured when quantitative measurement of the phase of the wavefront of the beam is available.

Except the above mentioned matters, Embodiments 1 and 2 are the same.

Embodiment 3

A method of adjusting the light source device in Embodiment 3 of the present invention (in particular, a method of axially adjusting a collimator position in the light source device) will be described below. Embodiment 3 is explained in the following sections (A) and (B).

In the section (A), astigmatism caused by axial miss-alignment in a laser diode as a point-like light-emitting source will be explained.

In the section (B), a method to adjust a collimator position in the light source device axially, observing a wavefront of a flux of light (that is, a beam) which exits from the light source, will be explained.

The section (B) consists of subsections (B1) to (B4): The subsection (B1) describes a wavefront aberration in the exit beam from the light source device. The subsection (B2) provides an explanation of an interferometer (a lateral sharing interferometer) for horizontally dividing the flux of light in order to measure an axial wavefront curvature. The subsection (B3) addresses a preparative experiment for checking detection accuracy. The subsection (B4) relates to an alignment instrument (a practical system) for a light source device introduced into a manufacturing line.

(A) Astigmatism Caused by Axial Miss-alignment

Generally, a laser diode is a point-like light-emitting source with slight astigmatism. As can be understood from a schematic diagram of FIG. 10, a light-emitting point M on the meridional plane (that is, xz plane) is located inside an active layer 33b, whereas a light-emitting point S on the sagittal plane (that is, yz plane) is located on a cleaved surface 33a. Although an astigmatism (an astigmatic distance) AS depends on the structure of the laser diode, it would be within a range from two micrometers to several tens of micrometers.

Figure 11:
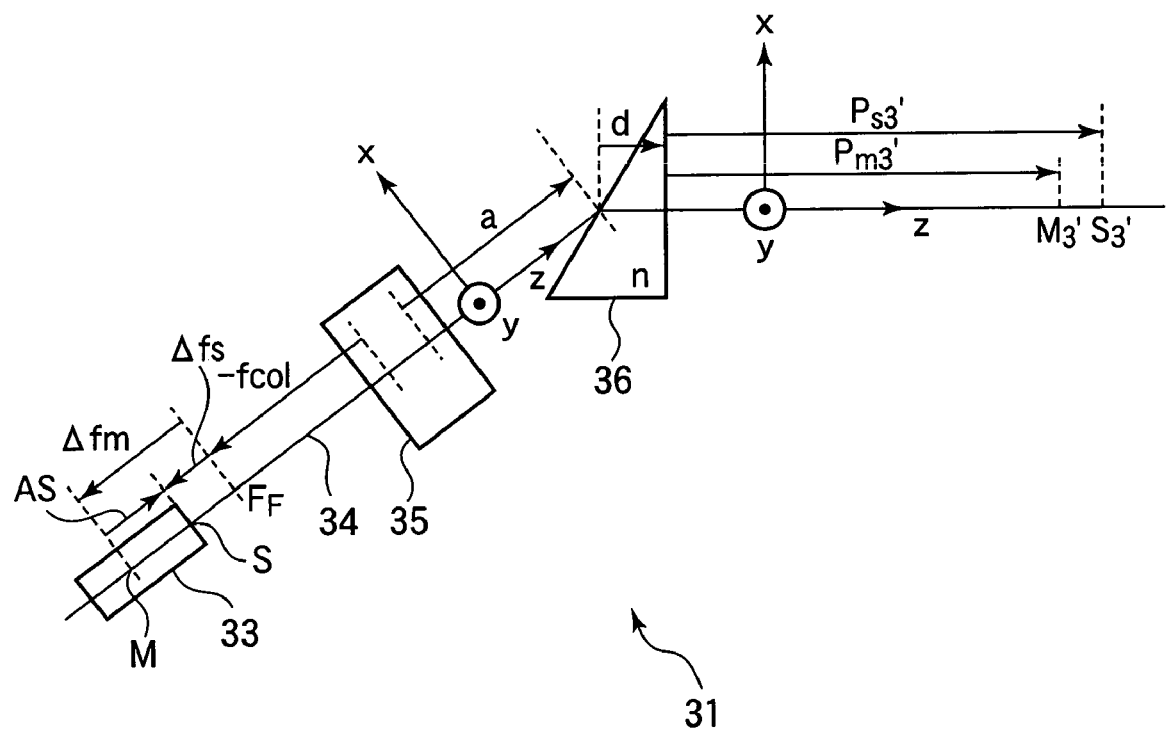
FIG. 11 illustrates a schematic model of an optical path from the laser diode through a focus of an objective lens (not shown), relating to Embodiment 3.

FIG. 11 represents a schematic model of an optical path 34 from a laser diode 33 through a focus of an objective lens (not shown). The light source device in FIG. 11 includes the laser diode 33 with astigmatism, a collimator 35, a triangular prism for beam shaping (that is, a beam shaping prism) 36 and the objective lens (not shown). The beam shaping prism 36 works as an anamorphic beam expander that magnifies the beam width on the meridional plane (that is, xz plane) by "m".

Next, we perform Gaussian ray tracing to obtain the astigmatic distance of a focused spot of the objective lens. To deal with astigmatism, a meridional ray and a sagittal ray should be separately traced based on first order ray tracing.

In FIG. 11, AS denotes the astigmatic distance of the laser diode 33, and a front focal point of the collimator 35 is indicated by $F_F$. Here, M and S are light-emitting points in the meridional plane (that is, xz plane) and in the sagittal plane (that is, yz plane), respectively. Moreover, $\Delta f_m$ is a distance from the point $F_F$ to the point M and $\Delta f_s$ is a distance from the point $F_F$ to the point S.

Where $M_1'$ (not shown) and $S_1'$ (not shown) are the meridional and sagittal image points of the collimator 35, respectively, $f_{col}$ is a focal length of the collimator 35, $P_{m1}'$ (not shown) and $P_{s1}'$ (not shown) are meridional and sagittal image point distances from the collimator 35 respectively, the following equations (1) and (2) appear as:

$$\frac{1}{P'_{m1}} = \frac{1}{-f_{col} + \Delta f_m} + \frac{1}{f_{col}} \tag{1}$$

$$\frac{1}{P'_{s1}} = \frac{1}{-f_{col} + \Delta f_s} + \frac{1}{f_{col}} \tag{2}$$

The following equations (3) and (4) can be obtained from the equations (1) and (2), respectively, as $\Delta f_m$ and $\Delta f_s$ are small values comparing with $f_{col}$.

$$P'_{m1} \cong -\frac{f_{col}^2}{\Delta f_m} \tag{3}$$

$$P'_{s1} \cong -\frac{f_{col}^2}{\Delta f_s} \tag{4}$$

Then, the distance $P_{m2}$ (not shown) from the meridional object point is expressed as:

$$P_{m2} = -a + P_{m1}'$$

The distance $P_{s2}$ (not shown) from the sagittal object point of the beam shaping prism 36 is expressed as:

$$P_{s2} = -a + P_{s1}'$$

Upon performing the astigmatic ray tracing inside the beam shaping prism 36, the distances $P_{m3}'$ and $P_{s3}'$ from the exit point of the beam shaping prism 36 to the meridional image point $M_3'$ and to the sagittal image point $S_3'$ can be expressed as the following equations (5) and (6):

$$P'_{m3} = \frac{\cos^2 i'_3}{\cos^2 i_3}\left(\frac{\cos^2 i'_2}{\cos^2 i_2} P_{m2} - \frac{d}{n}\right) \tag{5}$$

-continued $$P'_{s3} = P_{s2} - \frac{d}{n} \quad (6)$$

where n is a refractive index of the beam shaping prism 36 and d is a distance from the incident point to the exit point of the central ray. $i_2$ (not shown) and $i_2'$ (not shown) indicate an incident angle and a refractive angle of the beam at the incident point of the beam shaping prism 36, respectively, while $i_3$ (not shown) and $i_3'$ (not shown) are an incident angle and a refractive angle of the beam at the exit point of the beam shaping prism 36 respectively. It is comprehensible from FIG. 11 that because the incident angle $i_3$ and refractive angle $i_3'$ of the beam at the exit point of the beam shaping prism 36 are approximately 0°, equation (5) is expressed as the following equation (7) where $i_2'=\alpha$:

$$P'_{m3} \cong \frac{\cos^2 \alpha}{\cos^2 i_2} P_{m2} - \frac{d}{n} \quad (7)$$

Since the beam expansion primarily functions at the front surface of the beam shaping prism 36 (beam incident plane), $\cos \alpha/\cos i_2$ can represent a beam expansion ratio "m", so equation (7) becomes:

$$P'_{m3} \cong m^2 \cdot P_{m2} - \frac{d}{n} \quad (8)$$

Next, in order to determine focal points of the objective lens (not shown), the distances $P_{m4}'$ (not shown) and $P_{s1}'$ (not shown) to the meridional image point $M_4'$ (not shown) and to the sagittal image point $S_4'$ (not shown) respectively are expressed as follows with using the distances $P_{m3}'$ and $P_{s3}'$, a power of the objective lens $\phi_{obj}$ and a distance b (not shown) from the beam exit surface of the beam shaping prism 36 to the objective lens:

$$\frac{1}{P'_{m4}} = \frac{1}{-b + P_{m4}} + \varphi_{obj} \quad (9)$$
$$P_{m4} = P'_{m3} - b$$

$$\frac{1}{P'_{s4}} = \frac{1}{-b + P_{s4}} + \varphi_{obj} \quad (10)$$
$$P_{s4} = P'_{s3} - b$$

Put equations (8) and (6) into equations (9) and (10), respectively, then $P_{m4}'$ and $P_{s4}'$ are expressed with $P_{m1}'$ and $P_{s1}'$ respectively as follows:

$$\frac{1}{P'_{m4}} \cong \frac{1}{m^2 \cdot P'_{m1}} + \varphi_{obj} \quad (11)$$

$$\frac{1}{P'_{s4}} \cong \frac{1}{P'_{s1}} + \varphi_{obj} \quad (12)$$

Substitution equations (3) and (4) into the subtraction of equation (12) from equation (11) yields the following equation (13).

$$\frac{1}{P'_{m4}} - \frac{1}{P'_{s4}} \cong \frac{1}{m^2 \cdot P'_{m1}} - \frac{1}{P'_{s1}} \cong \frac{1}{f_{col}^2}\left(\Delta f_s - \frac{\Delta f_m}{m^2}\right) \quad (13)$$

Therefore, the astigmatic distance $\Delta Z$ of the focused spot on the disk radiated with the exit beam from the light source device becomes as follows:

$$\Delta Z \equiv P'_{s4} - P'_{m4} \cong \left(\Delta f_s - \frac{\Delta f_m}{m^2}\right)\frac{f_{obj}^2}{f_{col}^2} \quad (14)$$

where $P_{m4}'$ and $P_{s4}'$ are set to be equal to a focal length $f_{obj}$ of the objective lens.

As equation (14) directly shows, in order to make no-astigmatism, the collimator should be positioned such that the following equation (15) is satisfied.

$$\Delta f_s = \frac{\Delta f_m}{m^2} \quad (15)$$

However, if the collimator is positioned $\Delta f$ slightly away from the proper position, the focused spot on the optical disk is subject to additional astigmatism $\Delta Z'$, which is expressed as:

$$\Delta Z' \cong \left(1 - \frac{1}{m^2}\right)\frac{f_{obj}^2}{f_{col}^2}\Delta f \quad (16)$$

For example, assume that m=2.5, $f_{obj}$=3 mm, $f_{col}$=6 mm, which are usual values for optical heads, equation (16) becomes equation (17).

$$\Delta Z' \cong 0.21 \cdot \Delta f \quad (17)$$

Consequently, if it is necessary to keep the astigmatism $\Delta Z'$ within 0.21 μm in adjustment, the distance between the front focal point of the collimator and the exit point of the laser diode should be maintained to be less than 1.0 μm. Therefore, to move the collimator while detecting the position with an accuracy of sub-micron, an accurate measuring instrument should be equipped with stability against the external force. This is the reason why we started to investigate common path phase shifting interferometers.

[B] A Method of Axially Adjusting a Collimator Position in the Light Source Device (The Beam Shaping System)

[B1] Wavefront Aberration of the Exiting Beam from the Light Source Device

First, it is assumed that the residual aberrations of the exiting beam from the beam shaping prism in the light source device are just defocusing and astigmatism, because the defocusing and astigmatism are primary aberrations of the laser diode and the diffraction-limited collimator. When the reference beam is a plane wave proceeding in z direction along the optical axis, the wavefront aberration W(x, y) can be expressed as equation (18).

$$W(x,y)=W_x \cdot x^2 + W_y \cdot y^2 \quad (18)$$

Here, x and y are normalized coordinates at the exit surface of the beam shaping prism so that $(x^2+y^2)$ is not more than one and $W_x$ and $W_y$ are coefficients of the aberrations in units of the wavelength. $W_x$ is an amount of the displacement of the observed wavefront at the exit pupil rim (x=1, y=0) from a plane wavefront. Since the positions of $P_{s3}'$ and $P_{m3}'$ are obtained from equations (6) and (8), those equations can be simplified under conditions such as:

$$\Delta f_m \ll f_{col}, \Delta f_m \ll a, \Delta f_m \ll d$$

$$\Delta f_s \ll f_{col}, \Delta f_s \ll a, \Delta f_s \ll d$$

$$P_{s3}' = P_{s2} - \frac{d}{n} \approx -\frac{f_{col}^2}{\Delta f_s} \quad (19)$$

$$P_{m3}' = m^2 \cdot P_{m2} - \frac{d}{n} \approx -\frac{m^2 \cdot f_{col}^2}{\Delta f_m} \quad (20)$$

Upon setting the beam radius at the exit surface of the beam shaping prism to be $r_0$, the aberration coefficients $W_x$ and $W_y$ in equation (18) which represents the wavefront aberration as a function of $P_{s3}'$ and $P_{m3}'$ appear in the following equations (21) and (22):

$$W_x = -\frac{r_0^2}{2\lambda P_{m3}'} = \frac{\Delta f_m}{2m^2 \cdot \lambda} NA_{col}^2 \quad (21)$$

$$W_y = -\frac{r_0^2}{2\lambda P_{s3}'} = \frac{\Delta f_s}{2\lambda} NA_{col}^2 \quad (22)$$

$NA_{col}$ is the numerical aperture of the collimator, which is given as:

$$NA_{col} = \frac{r_0}{f_{col}} \quad (23)$$

Figure 10:
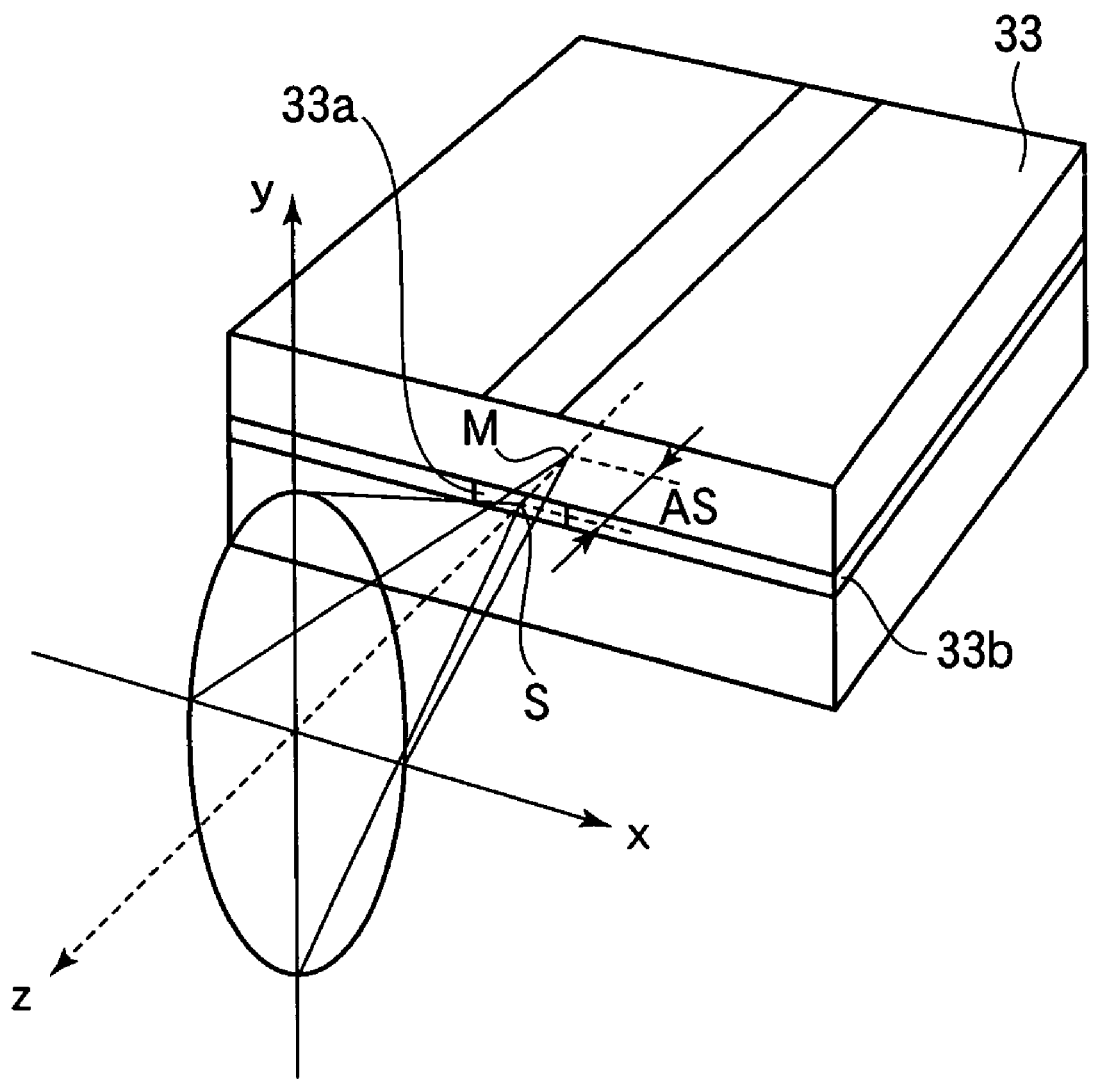
FIG. 10 illustrates a flux of light which exits from a laser diode, relating to Embodiment 3.
Figure 12:
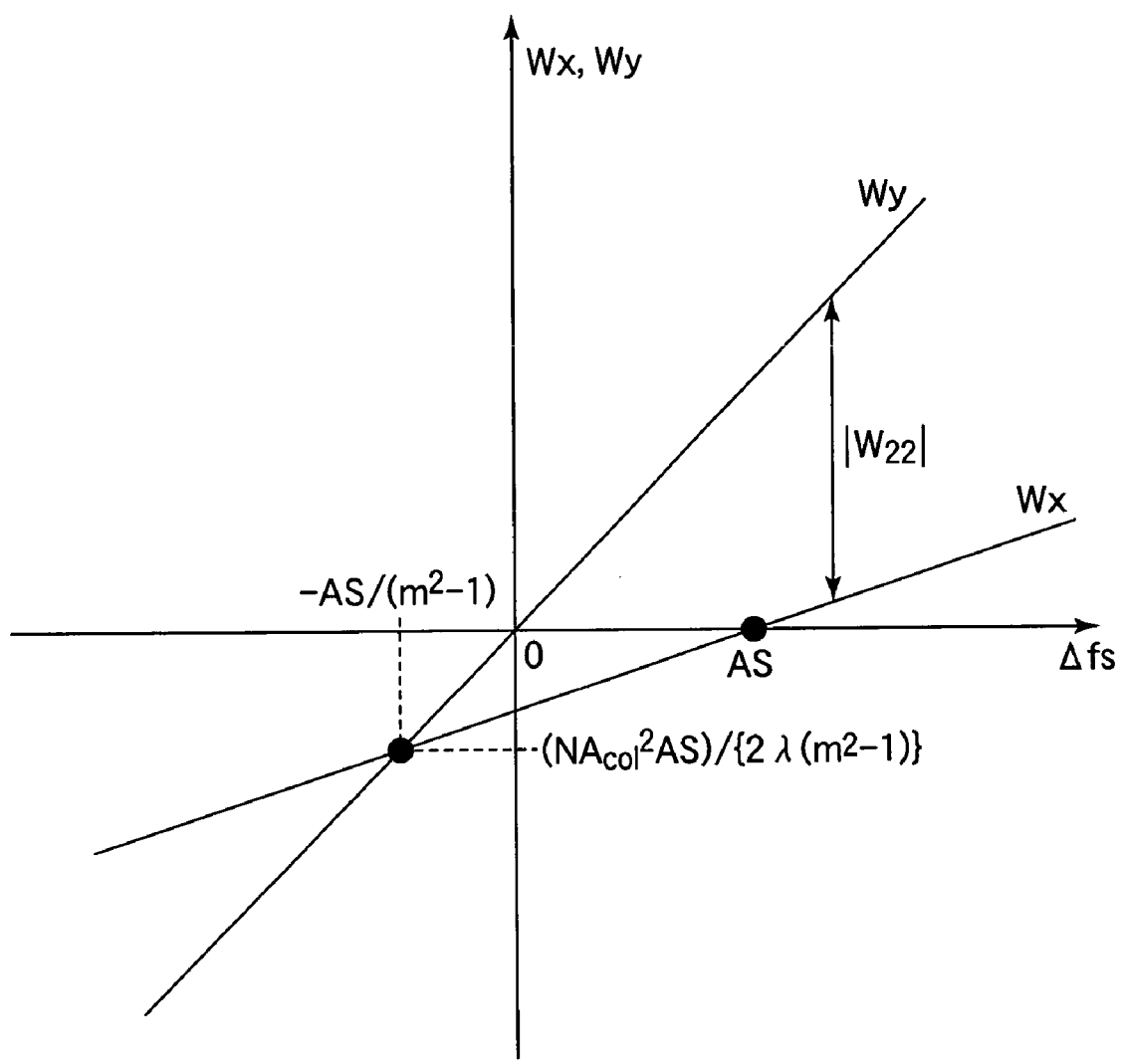
FIG. 12 illustrates a graph representing wavefront aberration coefficients which are functions of an interval between the laser diode and a collimator, relating to Embodiment 3.

As shown in FIG. 10 or FIG. 11, AS=$\Delta f_s - \Delta f_m$ and so the aberration coefficients $W_x$ and $W_y$ can be represented as functions of $\Delta f_s$ according to equations (21) and (22) whose graphs are illustrated in FIG. 12.

The graphs indicate that the astigmatic aberration of the beam outgoing from the beam shaping prism becomes zero when $\Delta f_s = -AS/(m^2-1)$. For example, when we have AS=5 μm and m=2.5, $\Delta f_s$ must be $-5/(2.5^2-1)$, i.e., approximately $-0.95$ for the astigmatic aberration being zero. That is, the front of the laser diode chip is 0.95 μm away from the front focal point ($F_F$) of the collimator.

[B2] Lateral Sharing Interferometer for Measuring One-axis Wavefront's Curvature Assume that the complex amplitude of the exiting beam from the beam shaping prism of the light source device is $A(x, y)$ and its amplitude term is $a(x, y)$, the complex amplitude $A(x, y)$ can be expressed using the wavefront aberration $W(x, y)$ as:

$$A(x,y) = a(x,y) \cdot \exp\{i \cdot 2\pi W(x,y)\} \quad (24)$$

Then, the complex amplitudes $A_+(x, y)$ and $A_-(x, y)$ of laterally shared waves by s in +x and –x direction respectively are given by the next equation (25):

$$A_\pm(x, y) = a(x \mp s, y) \cdot \exp\left[i \cdot \left\{2\pi W(x \mp s, y) \pm \frac{\theta}{2}\right\}\right] \quad (25)$$

where θ is the constant phase difference between the two beams.

Figure 13:
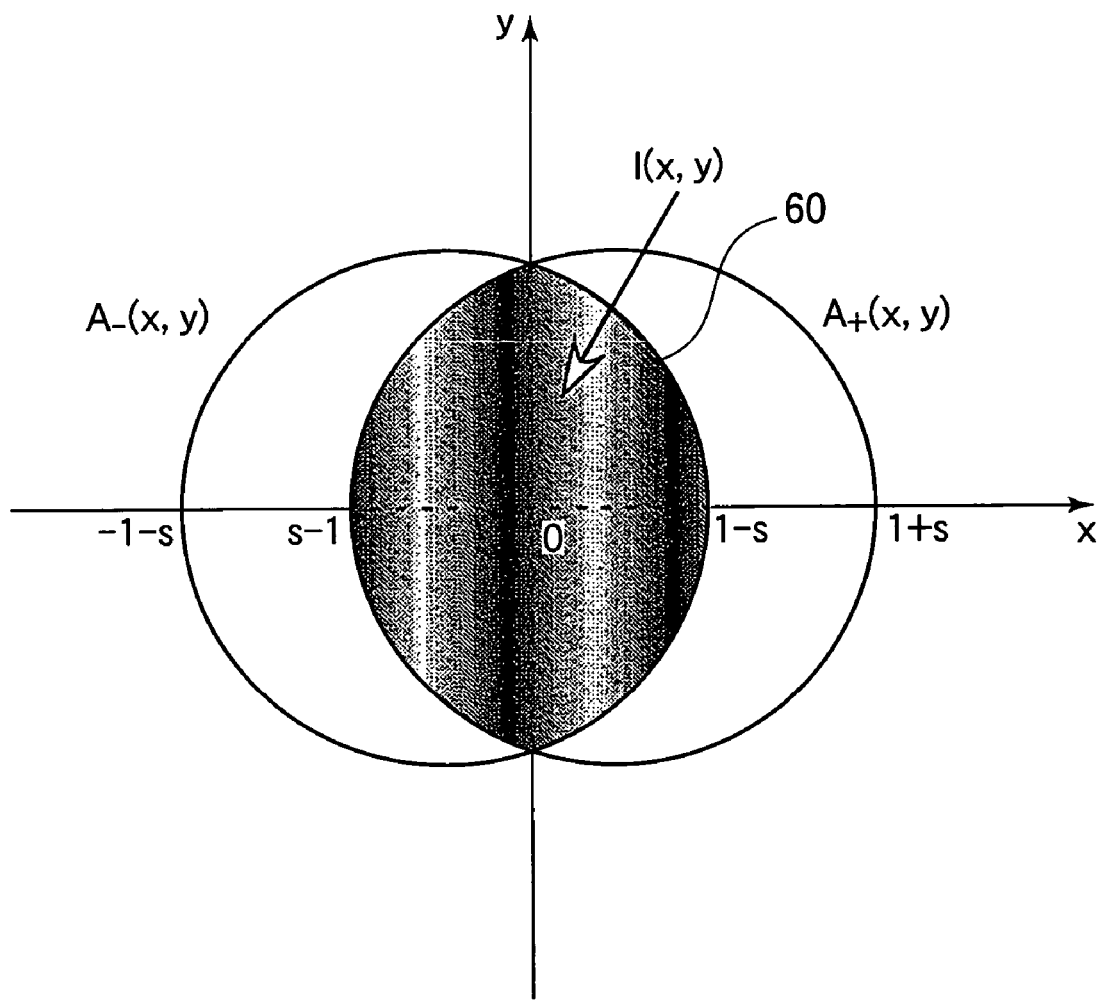
FIG. 13 illustrates interference fringes formed in an area in which two laterally shifted beams overlap, relating to Embodiment 3.

As shown in FIG. 13, an interference area 60 where two waves overlap each other is caused by their spatial coherency. The intensity distribution I(x, y) in the interference area 60 is expressed as:

$$I(x, y) = |A_+(x, y) + A_-(x, y)|^2 \quad (26)$$
$$= \{a(x-s, y)\}^2 + \{a(x+s, y)\}^2 + 2a(x-s, y) \cdot$$
$$a(x+s, y) \cdot \cos[2\pi\{W(x-s, y) - W(x+s, y)\} + \theta]$$

Substitution of equations (18), (21) and (22) into equation (26) yields the following equation (27).

$$I(x, y) = \{a(x-s, y)\}^2 + \{a(x+s, y)\}^2 + \quad (27)$$
$$2a(x-s, y) \cdot a(x+s, y) \cdot \cos(2\pi \cdot 4sW_x \cdot x - \theta)$$

The third term of equation (27) describes that straight fringe with a spatial frequency of $4sW_x$ appears in the overlap area so that a well-known fringe-scanning technique is able to be adopted for obtaining $W_x$ with remarkable accuracy.

Before explaining a fringe-scanning lateral-sharing interferometer specially designed, we will investigate how much phase observed corresponds to the spot movement focused by an objective lens. See fringes with a spatial frequency of $4sW_x$ existing from (s−1) through (1−s) on the x axis in FIG. 13. The phase difference $\Delta \phi_x$ between the both edges from (s−1) to (1−s) is given as the next equation (28):

$$\Delta\phi_x = 2\pi \cdot 4sW_x(1-s) - 2\pi \cdot 4sW_x(s-1) = 16\pi \cdot W_x s(1-s) \quad (28)$$

$\Delta \phi_x$ reaches its maximum $4\pi W_x$ at s=0.5. Also the sagittal focused-spot movement $\Delta z_x$ is related to $W_x$ as follows:

$$\Delta z_x = \frac{2\lambda W_x}{NA_{obj}^2} \quad (29)$$

Therefore, from equations (28) and (29), we obtain that $\Delta \phi_x$=12.96 (deg.) corresponds to $\Delta z_x$=0.1 μm at λ=0.78 μm and $NA_{obj}$=0.53 when s=0.5. This brief investigation concludes that the well-known fringe-scanning technique for sub-fringe analysis shall work quite well because $\Delta \phi_x$=12.96 (deg.) is too small to detect by use of it.

[B3] Experiment for Preparative Detection-accuracy Confirmation

Robustness against angular variation of incident-beam's propagation direction is a requirement of account to the interferometer (corresponding to the first and second interference fringe display sections in Embodiment 2) to be used in the light wavefront measuring apparatus because the propagation direction slightly fluctuates when the collimator's axial position is fine-tuned by use of mechanical means. One solution seems to use a lateral-sharing interferometer with two diffraction gratings since two beams making interference with each other keep the deviation between propagation directions to be constant when the incident angle barely and abruptly changes.

Figure 14:
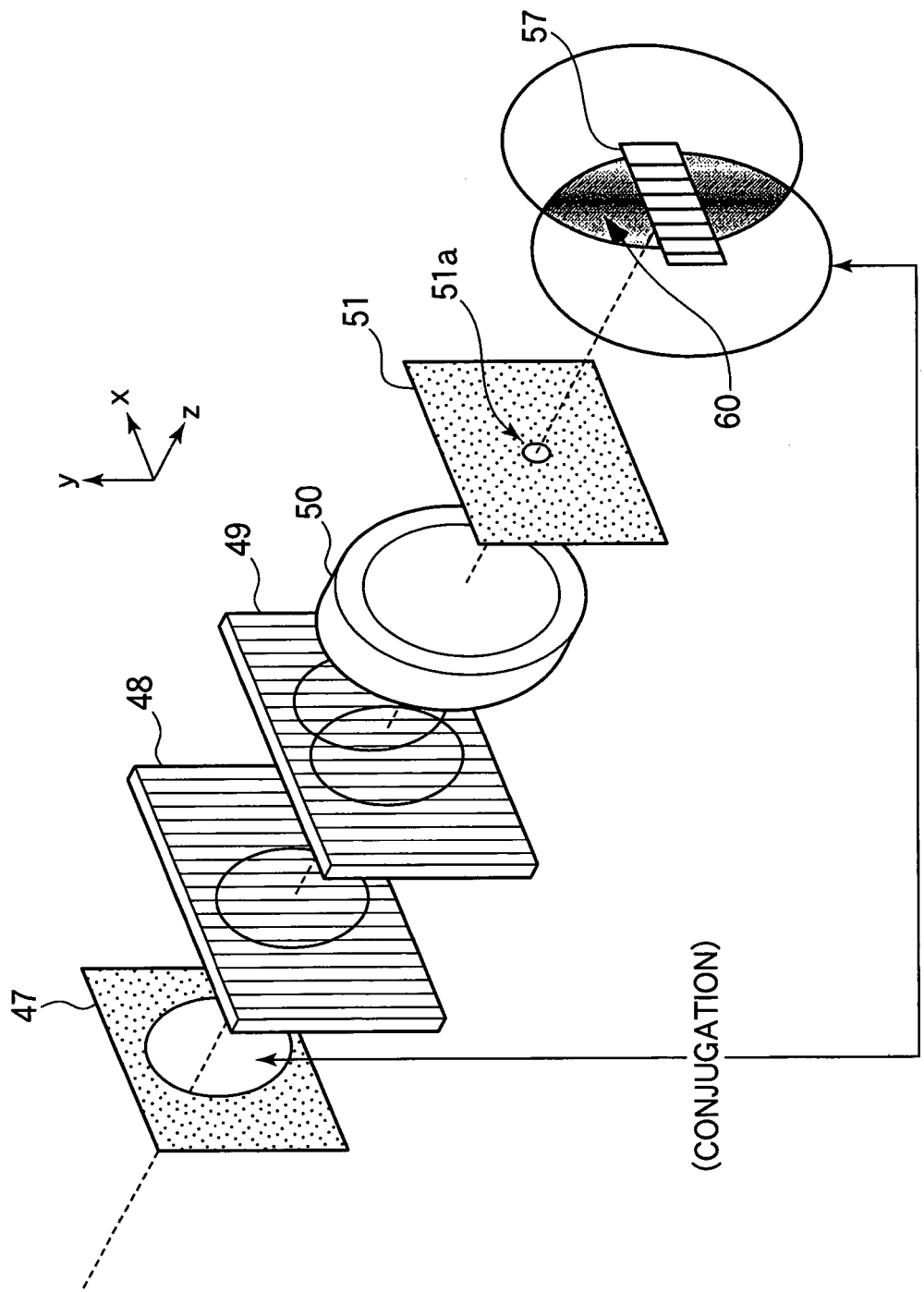
FIG. 14 illustrates a schematic diagram of an interferometer, relating to Embodiment 3.

FIG. 14 shows a schematic diagram of the interferometer's optical system for accuracy confirmation. A first stage diffraction grating 48 (corresponding to the first diffraction grating 8a and the third diffraction grating 8b in Embodiments 1 and 2) that is a relief-type binary phase diffraction grating with a pitch of 25 μm produces two diffracted beams, plus and minus 1st order beams (+1st and −1st order beams), each of which propagates in slightly different and symmetrical direction with respect to the propagation direction of the incident beam which passed through an aperture 47. A second stage diffraction grating 49 (corresponding to the second diffraction grating 9a and the fourth diffraction grating 9b in Embodiments 1 and 2) which is the same as the first stage diffraction grating 48 deflects these two beams into the same direction as that of the incident beam. Overlapped two beams are projected onto a silicon-photodetector-array 57 (HAMAMATSU PHOTONICS: production number S2311) through a camera lens 50 (focal length f=55 mm) and a circular pinhole 51a etched on a steel plate 51 which rejects stray beams caused by unnecessary diffraction orders by the two diffraction gratings 48 and 49. Linearly moving the first stage diffraction grating 48 in the grating vector's direction (x-axis direction) gives rise to fringe-scanning in the overlapped area on the photodetector-array 57. For that purpose, a precision linear stage having 0.1 μm-resolution positioning encoder (reference numeral 55 in FIG. 15 described below) (MICRO-CONTROL: production number UT-100) and a motor driver with GPIB interface (reference numeral 56 in FIG. 15 described below) (MICRO-CONTROL: production number IT6D CA2) are provided.

Figure 15:
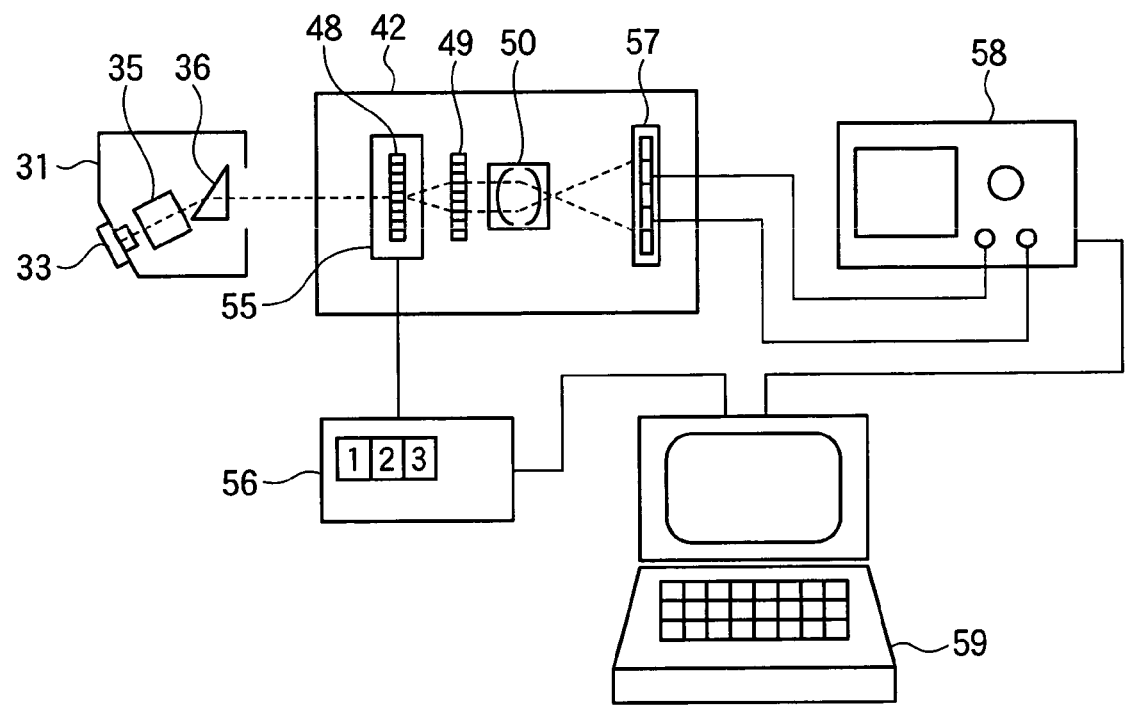
FIG. 15 illustrates an experimental setup for determining a phase difference between a plus 1st order beam and a minus 1st order beam generated at the interferometer, relating to Embodiment 3.

FIG. 15 illustrates a configuration of the experimental setup. To process two sinusoidal signals (CH1 and CH2 in FIG. 17 described below) put out by two elements in the photodetector array 57 for determining the phase difference $\Delta \phi_x$ between the plus and minus 1st-order beams generated in an interferometer 42, a GPIB programmable digital oscilloscope 58 (TEKTRONIX: production number 2440) and a personal computer 59 (HEWLETT-PACKARD: production number HP-9836A) equipped with a GPIB controller are used.

Figure 16:
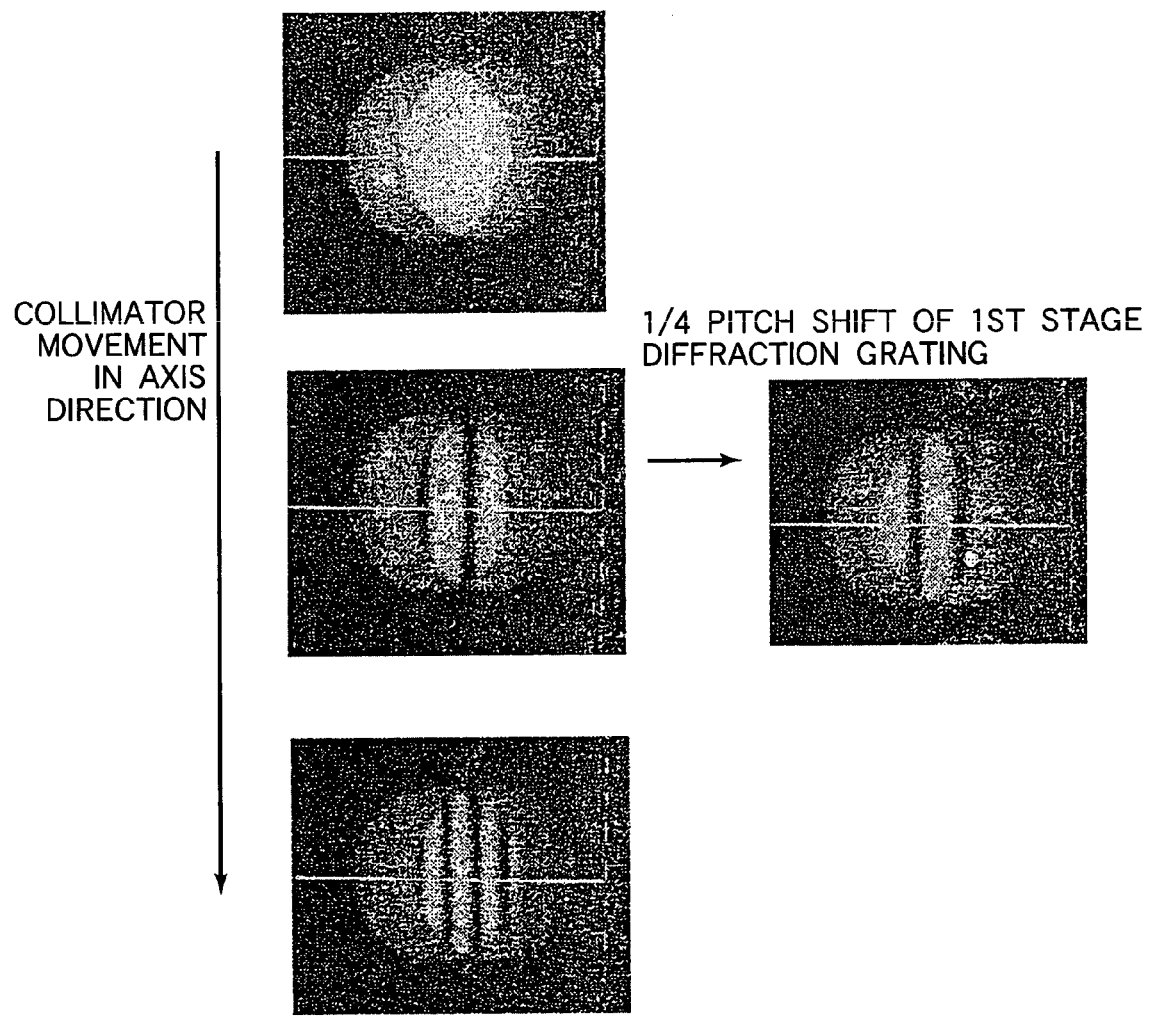
FIG. 16 shows photos, taken by a CCD camera, changes in interference fringes caused by a change in a collimator position or caused by movement of a diffraction grating in the interferometer in the experimental setup of FIG. 15.

FIG. 16 illustrates a series of fringe patterns generated by a beam exiting from a beam shaping optics (the light source device 31 in FIG. 15), observed on a photodiode-array plane (that is, on a plane on which the photodetector-array 57 is placed), in three axial positions of the collimator, whose variation is within two micrometers. Due to variation of the aberration coefficient $W_x$ (see FIG. 12) caused by defocusing, the fringe's spatial frequency changed zero to two lines in the overlapped area (upper to lower in FIG. 16).

Figure 17:
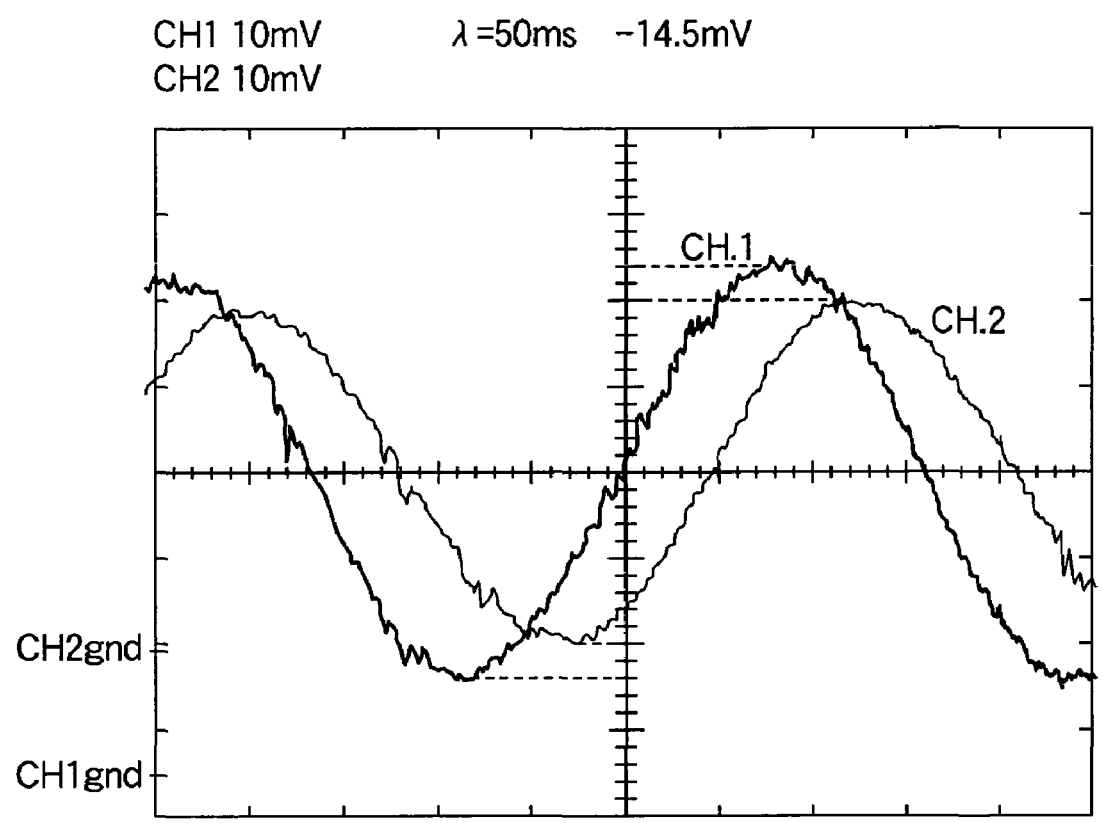
FIG. 17 illustrates waveforms of output signals from two elements of a photodetector-array when the phase difference between the plus and minus 1st order beams generated at the interferometer is 52.6 degrees and a first stage diffraction grating of the interferometer moves at a constant speed, in the experimental setup of FIG. 15.

FIG. 17 presents the signal waveforms (CH1 and CH2) from the two elements on the photodetector-array 57 located in the overlapped area and whose separation was 90% of its width while the linearly moving stage is moving at a constant speed. As expected, phase difference of sinusoidal waves is proportional to the wavefront curvature.

Figure 18:
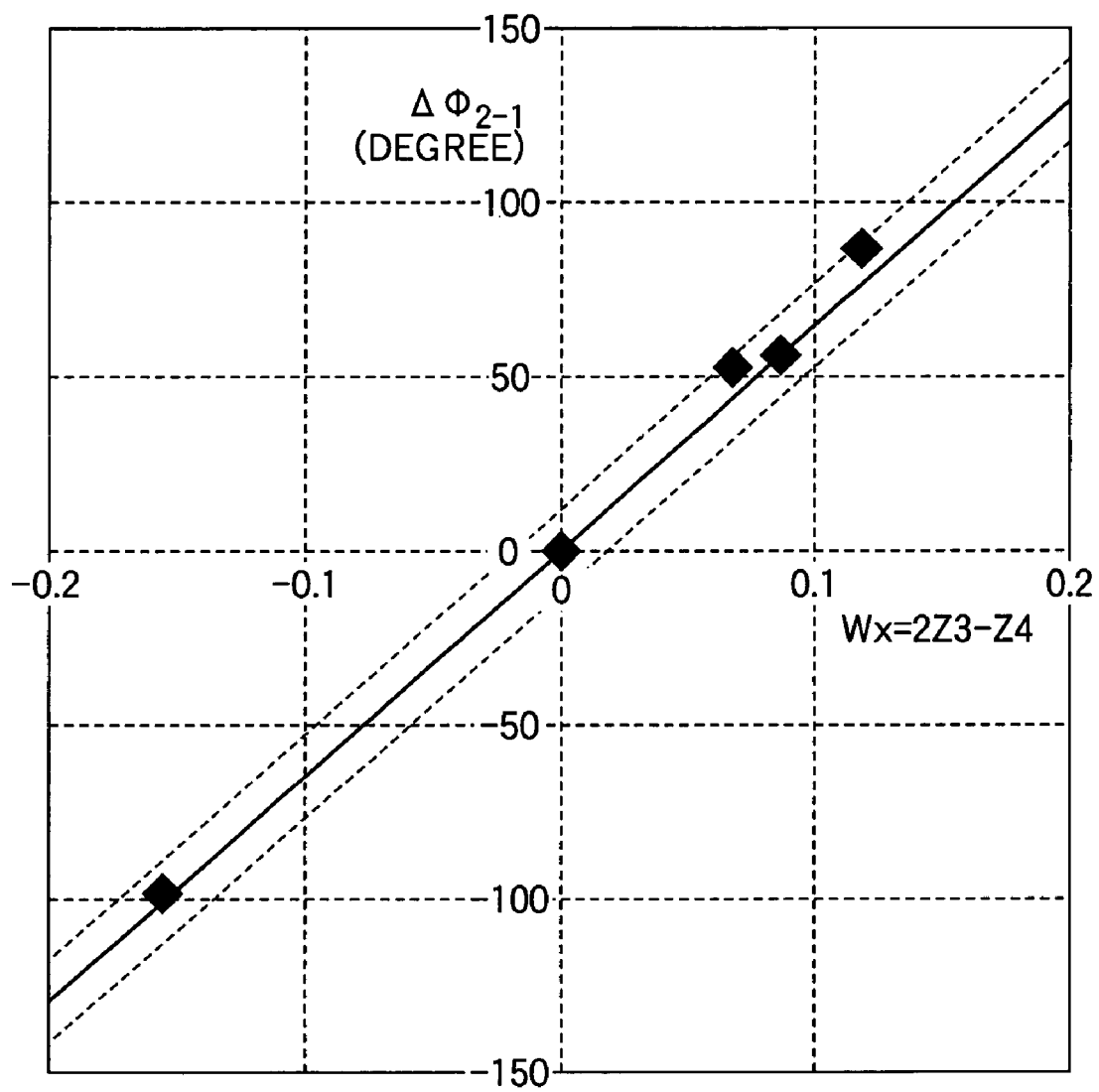
FIG. 18 illustrates data of a wavefront analyzer (horizontal axis) and values of phase $\Delta \phi_{2\text{-}1}$ (vertical axis) measured by using the experimental setup in FIG. 15.

FIG. 18 illustrates a measurement of the phase (vertical axis) by use of this experimental setup. This phase $\Delta \phi_{2-1}$ was compared with data of a wavefront analyzer (Zygo: production number WA8100)(horizontal axis). In this plot, the aberration coefficient $W_x$ is determined by $W_x=2 \cdot Z3+Z4$ from the third term (Z3) and the fourth term (Z4) of Zernike coefficients put out by the wavefront analyzer (Zygo: production number WA8100). Theoretical line is a linear line without zero offset (the solid straight line in FIG. 18). Through this experiment and the following investigations, the measurement accuracy of the astigmatic distance can be kept within 0.1 μm at the focus by an objective lens whose NA is 0.5 to 1.5.

Figure 19:
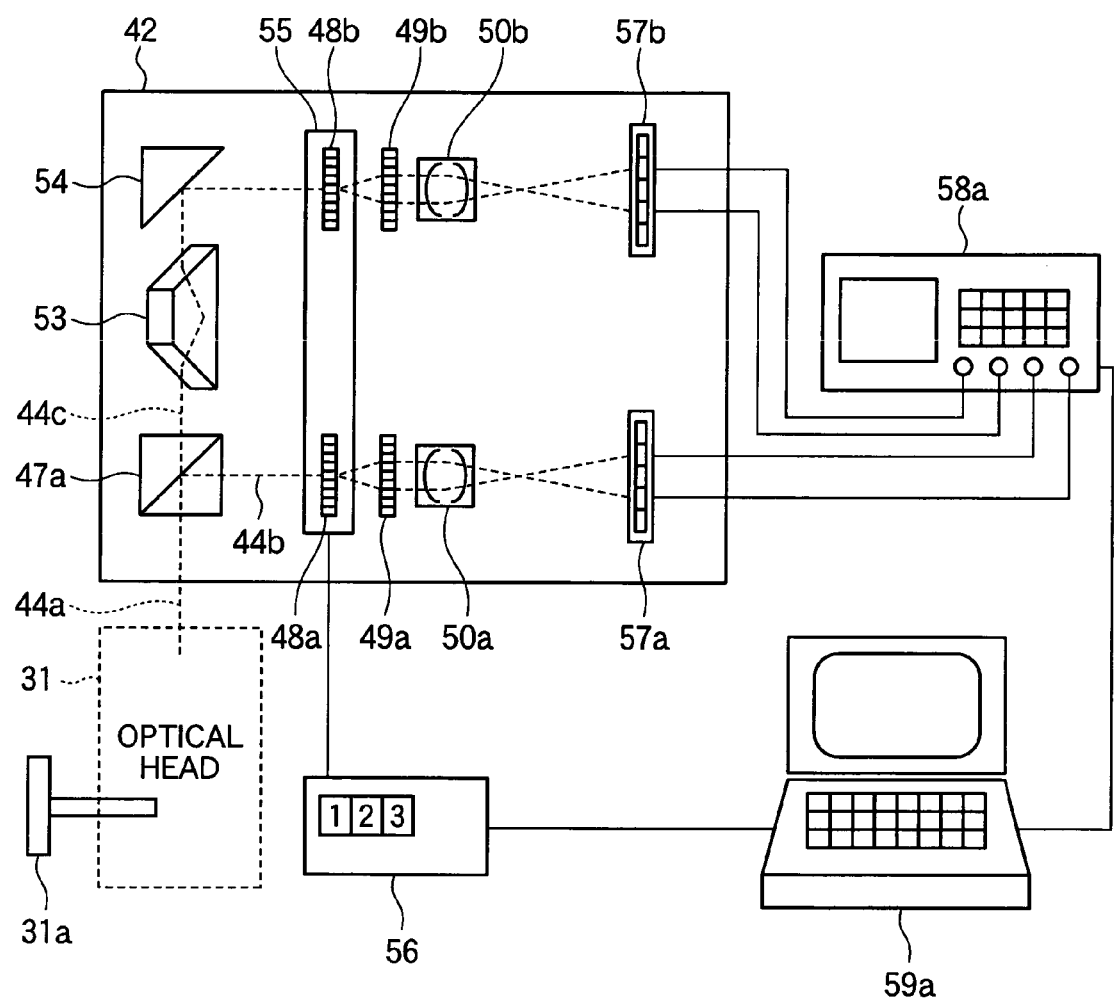
FIG. 19 illustrates a practical system which is introduced into a manufacturing line in order to adjust the light source device, relating to Embodiment 3.

[B4] Alignment Instrument for a Light Source Device Introduced into a Manufacturing Line Based on theoretical investigation and two preparative experiments, a practical system was designed, whose configuration is shown in FIG. 19 (that is, the configuration of a system used for carrying out the light source device adjusting method in Embodiment 3). Its main improvement on the experimental setup in FIG. 15 is ability of simultaneous observing/qualifying both of the aberration coefficients $W_x$ and $W_y$, by use of such as a Dove prism 53. As shown in FIG. 19, an incident beam 44a from the optical head 31 on the light wavefront measuring apparatus 42 is divided into two similar beams 44b and 44c in intensity by a cubic prism 47a. The one beam 44b proceeds into a first stage diffraction grating 48a (corresponding to the first diffraction grating 8a in Embodiments 1 and 2). The other beam 44c enters the Dove prism 53 for ninety-degree coordinate rotation around the optical axis and changes its direction of travel at a mirror 54 before hitting a first stage diffraction grating 48b (corresponding to the third diffraction grating 8b in Embodiments 1 and 2).

An interference area is formed on a photodiode array 57a by the first stage diffraction grating 48a and a second stage diffraction grating 49a (corresponding to the second diffraction grating 9a in Embodiments 1 and 2), and a focus lens 50a. The other interference area is formed on a photodiode array 57b by the first stage diffraction grating 48b and a second stage diffraction grating 49b (corresponding to the fourth diffraction grating 9b in Embodiments 1 and 2) and a focus lens 50b. Thus, the two interference areas are formed on the two photodiode arrays 57a and 57b, scanning of interference fringes can be scanned in two orthogonal directions.

The practical system shown in FIG. 19 is controlled by a personal computer 59a equipped with a GPIB controller and its control software with a display module is written by C-language. The display module secures real-time presentation of the phase difference in both directions on a display monitor. The collimator position (not shown in FIG. 19) in the optical head 31 is axially adjusted by a mechanical tool 31a very precisely (for example, power from an adjustment knob which is manually rotated or a driver such as a motor, not shown) so that the phase difference corresponding to ($W_x - W_y$) reaches almost zero with reasonable tolerance. Efficiency of the adjustment can be improved by adjusting the collimator position automatically based on a detection signal of the photodetector-array according to commands from the personal computer 59a.

Using the practical system shown in FIG. 19, beam shaping optics of mass-produced optical heads for 130 mm 2.6/5.2 Gbytes magneto-optical disks are adjusted. The astigmatic distance of the focused spot was accordingly specified within 0.5 μm, which is defined as the distance between the pre-formatted (tangential) signal maximum point and the tracking-error-signal (radial signal) maximum point. Consequently, the practical system of Embodiment 3 yields a successful result that optical heads complying with this criterion are adjusted with high yield, over 99% at the initial production stage, within proper time period allowed for adjustment.

The invention claimed is:
1. A light wavefront measuring apparatus comprising: a separating element separating a flux of incident light into a first beam and a second beam; a first interference fringe display section being placed in the first beam and displaying an interference fringe formed from the first beam; a second interference fringe display section having the same structure as a structure of the first interference fringe display section, the second interference fringe display section being placed in the second beam and displaying an interference fringe formed from the second beam; and a wavefront rotating element being placed at least one of between the separating element and the first interference fringe display section and between the separating element and the second interference fringe display section, the wavefront rotating element rotating at least one of wavefronts of the first beam and of the second beam around an optical axis thereof, wherein the first interference fringe display section comprises: a first diffraction grating being placed in the first beam; a second diffraction grating being placed in a beam which passed through the first diffraction grating; and a first display section displaying the interference fringe formed by a beam which passed through the second diffraction grating; wherein the second interference fringe display section comprises: a third diffraction grating having the same structure as a structure of the first diffraction grating and being placed in the second beam; a fourth diffraction grating having the same structure as a structure of the second diffraction grating and being placed in a beam which passed through the third diffraction grating; and a second display section displaying the interference fringe formed by a beam which passed through the fourth diffraction grating wherein the first display section and the second display section are disposed side by side and face in the same direction; wherein a grating vector of the first diffraction grating and a grating vector of the third diffraction grating are identical and the first and third diffraction gratings move unitarily in a direction of the grating vectors.

2. The light wavefront measuring apparatus according to claim 1, wherein the wavefront rotating element is placed one of between the separating element and the first interference fringe display section and between the separating element and the second interference fringe display section, and the wavefront rotating element rotates a wavefront of the incident light ninety degrees around an optical axis of the incident light.

3. The light wavefront measuring apparatus according to claim 1, wherein the wavefront rotating element is a Dove prism.

4. A light wavefront measuring apparatus comprising:
a separating element separating a flux of incident light into a first beam and a second beam;
a first interference fringe display section being placed in the first beam and displaying an interference fringe formed from the first beam;
a second interference fringe display section having the same structure as a structure of the first interference fringe display section, the second interference fringe display section being placed in the second beam and displaying an interference fringe formed from the second beam; and
a wavefront rotating element being placed at least one of between the separating element and the first interference fringe display section and between the separating element and the second interference fringe display section, the wavefront rotating element rotating at least one of wavefronts of the first beam and of the second beam around an optical axis thereof;
wherein the first interference fringe display section comprises the first diffraction grating placed in the first beam and the second diffraction grating placed in the beam which passed through the first diffraction grating;

wherein the second interference fringe display section comprises the third diffraction grating which has the same structure as the structure of the first diffraction grating and is placed in the second beam and the fourth diffraction grating which has the same structure as the structure of the second diffraction grating and is placed in the beam which passed through the third diffraction grating;
the light wavefront measuring apparatus further comprising:
first and second photodetectors being placed in positions where the interference fringes are formed by the beam which passed through the second diffraction grating and having a first interval between the first and second photodetectors;
third and fourth photodetectors being placed in positions where the interference fringes are formed by the beam which passed through the fourth diffraction grating and having a second interval equal to the first interval between the third and fourth photodetectors; and
a moving mechanism keeping a grating vector of the first diffraction grating and a grating vector of the third diffraction grating identical and moving the first and third diffraction gratings unitarily in a direction of the grating vectors.

5. The light wavefront measuring apparatus according to claim 4, further comprising a phase information display unit for displaying a first phase difference between a phase of an output signal from the first photodetector and a phase of an output signal from the second photodetector and a second phase difference between a phase of an output signal from the third photodetector and a phase of an output signal from the fourth photodetector.

6. The light wavefront measuring apparatus according to claim 4, wherein the wavefront rotating element is placed one of between the separating element and the first interference fringe display section and between the separating element and the second interference fringe display section, and the wavefront rotating element rotates a wavefront of the incident light ninety degrees around an optical axis of the incident light.

7. The light wavefront measuring apparatus according to claim 4, wherein the wavefront rotating element is a Dove prism.

8. A method of measuring light wavefront comprising the steps of:
separating a flux of incident light into a first beam and a second beam;
rotating at least one of a wavefront of the first beam and a wavefront of the second beam around an optical axis thereof; and
displaying an interference fringe of the first beam by a first interference fringe display section and displaying an interference fringe of the second beam by a second interference fringed display section;
wherein the first interference fringe display section has a first diffraction grating and a second diffraction grating, and the second interference fringe display section has a third diffraction grating whose structure is the same as a structure of the first diffraction grating and a fourth diffraction grating whose structure is the same as a structure of the second diffraction grating;
the method further comprising the steps of:
detecting changes in amount of light at first and second positions each being located where an interference fringe is generated by the beam which passed through the second diffraction grating and having a first interval between the first and second positions and changes in amount of light at third and fourth positions each being located where an interference fringe is generated by the beam which passed through the fourth diffraction grating and having a second interval equal to the first interval between the third and fourth positions, when a grating vector of the first diffraction grating and a grating vector of the third diffraction grating are held identical and the first and third diffraction gratings unitarily move in a direction of the grating vectors; and measuring a first phase difference between phases of waveforms indicating the changes in amount of light at the first and second positions and a second phase difference between phases of waveforms indicating the changes in amount of light at the third and fourth positions.

9. The method of measuring light wavefront according to claim 8, wherein one of the wavefront of the first beam and the wavefront of the second beam is rotated ninety degrees around the optical axis in the rotating step.

10. A method of adjusting the light source device comprising the steps of:

separating a flux of light which exits from the light source device into a first beam and a second beam;

rotating at least one of wavefronts of the first beam and of the second beam around an optical axis thereof;

displaying an interference fringe of the first beam by a first interference fringe display section and displaying an interference fringe of the second beam by a second interference fringed display section; and adjusting a position of an optical member in the light source device so as to equate the interference fringe of the first beam and the interference fringe of the second beam;

wherein the first interference fringe display section has a first diffraction grating and a second diffraction grating, and the second interference fringe display section has a third diffraction grating whose structure is the same as a structure of the first diffraction grating and the fourth diffraction grating whose structure is the same as a structure of the second diffraction grating;

the method further comprising the steps of:

detecting changes in amount of light at first and second positions each being located where an interference fringe is generated by a beam which passed through the second diffraction grating and having a first interval between the first and second positions and changes in amount of light at third and fourth positions each being located where an interference fringe is generated by a beam which passed through the fourth diffraction grating and having a second interval equal to the first interval between the third and fourth positions, when a grating vector of the first diffraction grating and a grating vector of the third diffraction grating are held identical and the first and third diffraction gratings unitarily move in a direction of the grating vectors; and measuring a first phase difference between phases of waveforms indicating the changes in amount of light at the first and second positions and a second phase difference between phases of waveforms indicating the changes in amount of light at the third and fourth positions;

wherein a position of the optical member in the light source device is adjusted so as to equate the first phase difference and the second phase difference in the step of adjusting the position of the optical member.

11. The method of adjusting the light source device according to claim 10, wherein one of the wavefronts of the first beam and of the second beam is rotated ninety degrees around the optical axis in the rotating step.

* * * * *